US012659357B1

(12) United States Patent

Yang

(10) Patent No.: US 12,659,357 B1

(45) Date of Patent: Jun. 16, 2026

(54) CONTEXT AWARE INSPECTION OF GENERATIVE ARTIFICIAL INTELLIGENCE TRAFFIC USING A SLIDING WINDOW

(71) Applicant: Netskope, Inc., Santa Clara, CA (US)

(72) Inventor: Siying Yang, Saratoga, CA (US)

(73) Assignee: Netskope, Inc., Santa Clara, CA (US)

( * ) Notice: Subject to any disclaimer, the term of this patent is extended or adjusted under 35 U.S.C. 154(b) by 0 days.

(21) Appl. No.: 19/380,712

(22) Filed: Nov. 5, 2025

(51) Int. Cl.
$H04L\ 9/40$ (2022.01)
$G06F\ 40/289$ (2020.01)

(52) U.S. Cl.
CPC ............ H04L 63/20 (2013.01); G06F 40/289 (2020.01); H04L 63/0227 (2013.01); H04L 63/1408 (2013.01)

(58) Field of Classification Search
CPC ........................ H04L 63/0227; H04L 63/1408; G06F 40/289
See application file for complete search history.

(56) References Cited

U.S. PATENT DOCUMENTS

| | | | | |
|---|---|---|---|---|
| 12,476,993 | B1 * | 11/2025 | Cherp | H04L 63/1416 |
| 2003/0198183 | A1 * | 10/2003 | Henriques | H04M 15/58 |
| | | | | 370/229 |
| 2017/0289184 | A1 * | 10/2017 | C | H04L 63/1425 |
| 2025/0307418 | A1 * | 10/2025 | Spencer | G06F 21/577 |
| 2025/0356165 | A1 * | 11/2025 | Davis | G06N 3/0442 |
| 2025/0371133 | A1 * | 12/2025 | Mantin | G06F 21/54 |
| 2025/0373656 | A1 * | 12/2025 | Jeevagunta | H04L 63/1466 |

OTHER PUBLICATIONS

SA. Akheel, "Guardrails for large language models: A review of techniques and challenges," J Artif Intell Mach Learn & Data Sci. 2025; 3(1):2504-12. (Year: 2025).*
S. Chennabasappa et al. "LlamaFirewall: An open source guardrail system for building secure AI agents," arXiv:2505.03574v1 [cs.CR] May 6, 2025. (Year: 2025).*
E. Keleş and Ş. Bahtiyar, "Promptshield: Policy-Aware DLP Framework for Generative AI Prompts," 2025 10th International Conference on Computer Science and Engineering (UBMK), Istanbul, Turkiye, 2025, pp. 1537-1542, (Year: 2025).*

(Continued)

*Primary Examiner* — Robert B Leung

(57) ABSTRACT

A network security system (NSS) is described that performs context aware GenAI traffic inspection using sliding windows. The NSS receives an interaction between an endpoint and a GenAI model, where data of the interaction arrives at the NSS in serial order. The NSS analyzes the interaction by storing the data in chunks in serial order as the data arrives, selecting a batch of the chunks including a target chunk that fall within a sliding window, evaluating the batch of chunks with a detection module that includes a language processing model such that the chunks in the batch preceding the target chunk provide context awareness for the language processing model, and repeatedly advancing the sliding window from the target chunk to the next chunk in serial order to select the next batch. The NSS applies a security policy to the interaction based on results of analyzing the interaction.

20 Claims, 11 Drawing Sheets

(56) References Cited

OTHER PUBLICATIONS

T. Huang, L. You, N. Cai and T. Huang, "Large Language Model Firewall for AIGC Protection with Intelligent Detection Policy," 2024 2nd International Conference On Mobile Internet, Cloud Computing and Information Security (MICCIS), Changsha City, China 2024, pp. 247-252. (Year: 2024).*

D. Jiang, J. Liu, Z. Xu and W. Qin, "Network traffic anomaly detection based on sliding window," 2011 International Conference on Electrical and Control Engineering, Yichang, China, 2011, pp. 4830-4833 (Year: 2011).*

* cited by examiner

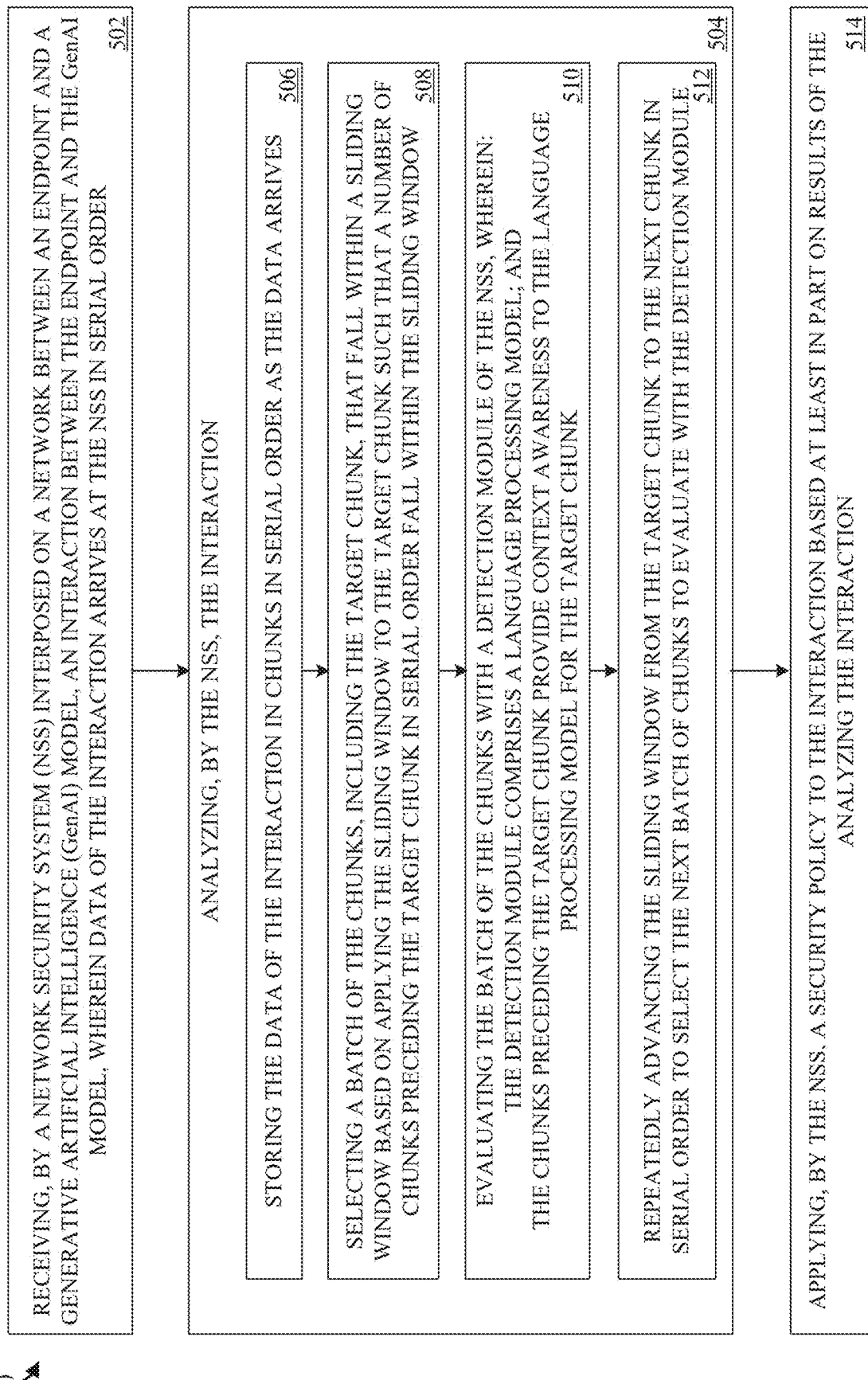

FIG. 5

RECEIVING, BY A NETWORK SECURITY SYSTEM (NSS) INTERPOSED ON A NETWORK BETWEEN AN ENDPOINT AND A GENERATIVE ARTIFICIAL INTELLIGENCE (GenAI) MODEL, AN INTERACTION BETWEEN THE ENDPOINT AND THE GenAI MODEL, WHEREIN DATA OF THE INTERACTION ARRIVES AT THE NSS IN SERIAL ORDER                502

ANALYZING, BY THE NSS, THE INTERACTION

STORING THE DATA OF THE INTERACTION IN CHUNKS IN SERIAL ORDER AS THE DATA ARRIVES                506

SELECTING A BATCH OF THE CHUNKS, INCLUDING THE TARGET CHUNK, THAT FALL WITHIN A SLIDING WINDOW BASED ON APPLYING THE SLIDING WINDOW TO THE TARGET CHUNK SUCH THAT A NUMBER OF CHUNKS PRECEDING THE TARGET CHUNK IN SERIAL ORDER FALL WITHIN THE SLIDING WINDOW                508

EVALUATING THE BATCH OF THE CHUNKS WITH A DETECTION MODULE OF THE NSS, WHEREIN: THE DETECTION MODULE COMPRISES A LANGUAGE PROCESSING MODEL; AND THE CHUNKS PRECEDING THE TARGET CHUNK PROVIDE CONTEXT AWARENESS TO THE LANGUAGE PROCESSING MODEL FOR THE TARGET CHUNK                510

REPEATEDLY ADVANCING THE SLIDING WINDOW FROM THE TARGET CHUNK TO THE NEXT CHUNK IN SERIAL ORDER TO SELECT THE NEXT BATCH OF CHUNKS TO EVALUATE WITH THE DETECTION MODULE                512

504

APPLYING, BY THE NSS, A SECURITY POLICY TO THE INTERACTION BASED AT LEAST IN PART ON RESULTS OF THE ANALYZING THE INTERACTION                514

500

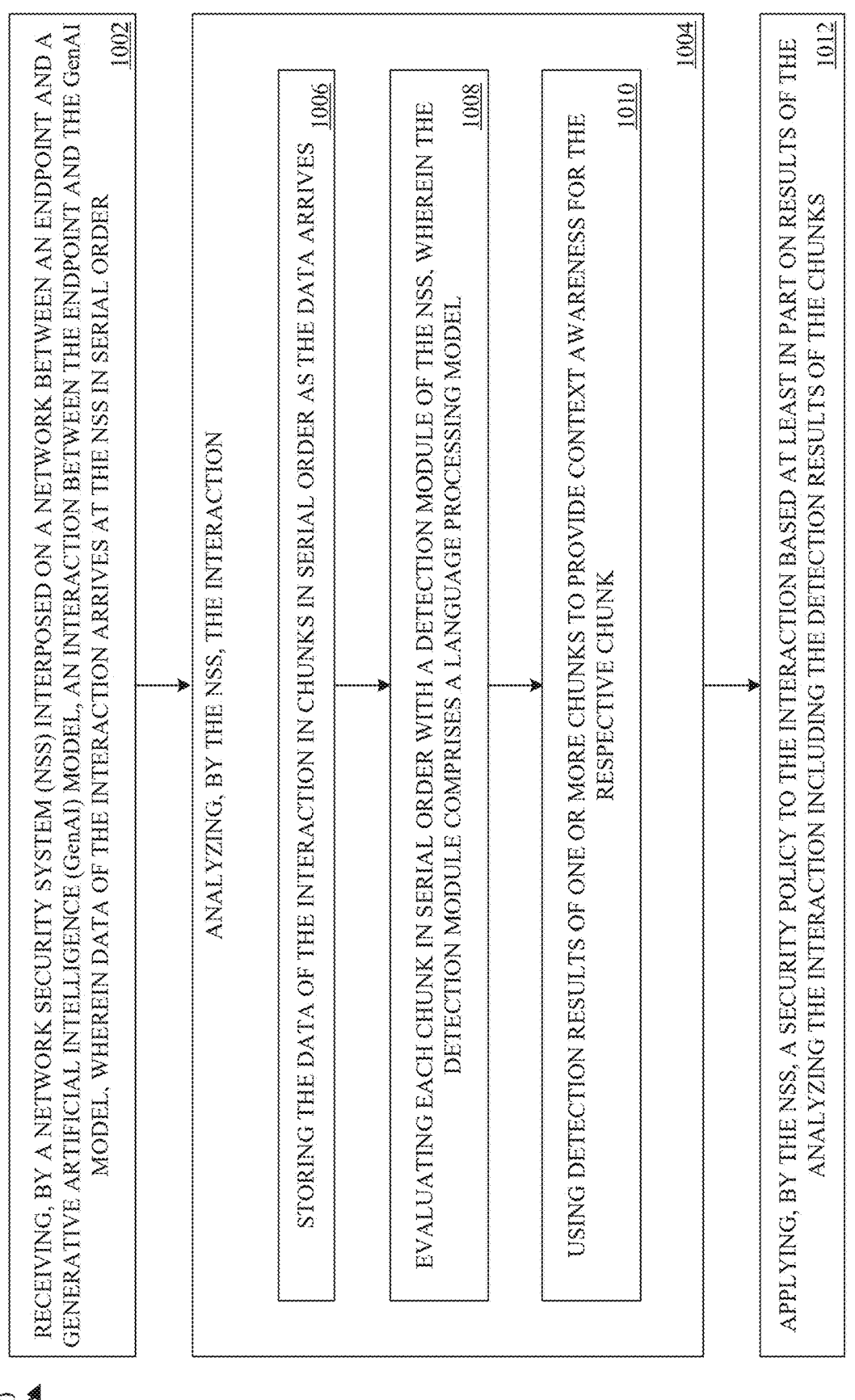

RECEIVING, BY A NETWORK SECURITY SYSTEM (NSS) INTERPOSED ON A NETWORK BETWEEN AN ENDPOINT AND A GENERATIVE ARTIFICIAL INTELLIGENCE (GenAI) MODEL, AN INTERACTION BETWEEN THE ENDPOINT AND THE GenAI MODEL, WHEREIN DATA OF THE INTERACTION ARRIVES AT THE NSS IN SERIAL ORDER 1002

ANALYZING, BY THE NSS, THE INTERACTION

STORING THE DATA OF THE INTERACTION IN CHUNKS IN SERIAL ORDER AS THE DATA ARRIVES 1006

EVALUATING EACH CHUNK IN SERIAL ORDER WITH A DETECTION MODULE OF THE NSS, WHEREIN THE DETECTION MODULE COMPRISES A LANGUAGE PROCESSING MODEL 1008

USING DETECTION RESULTS OF ONE OR MORE CHUNKS TO PROVIDE CONTEXT AWARENESS FOR THE RESPECTIVE CHUNK 1010

1004

APPLYING, BY THE NSS, A SECURITY POLICY TO THE INTERACTION BASED AT LEAST IN PART ON RESULTS OF THE ANALYZING THE INTERACTION INCLUDING THE DETECTION RESULTS OF THE CHUNKS 1012

CONTEXT AWARE INSPECTION OF GENERATIVE ARTIFICIAL INTELLIGENCE TRAFFIC USING A SLIDING WINDOW

CROSS-REFERENCE TO RELATED APPLICATIONS

This application is related to U.S. patent application Ser. No. 19/380,727, titled "CONTEXT AWARE INSPECTION OF GENERATIVE ARTIFICIAL INTELLIGENCE TRAF-FIC USING MULTIDIMENSIONAL DETECTION RESULTS,", filed Nov. 5, 2025, the contents of which is herein incorporated by reference in its entirety.

BACKGROUND

Generative artificial intelligence (GenAI) technologies such as large language models (LLMs) bring dramatic productivity improvements and automation in many industries. Many enterprises and organizations have started to adopt GenAI services and models. At the same time, GenAI has unique security, privacy, and ethical challenges. To mitigate these challenges, most organizations implement inline guardrails in front of the GenAI models. The guardrails provide the ability to inspect bi-directional GenAI traffic, including user prompts and the GenAI model responses, and then enforce policy actions in real time.

An example GenAI guardrail technology is a man-in-the-middle (MITM) security product, deployed between the endpoint (e.g., end user or agentic application) and the GenAI model. The MITM intercepts bidirectional traffic and inspects it. Inspection may include using one or more detection technologies for identifying the security, privacy, and ethical issues. The detection technologies include detection models such as natural language processing (NLP) models (often called small language models (SLMs)) and LLMs dedicated to detection for the MITM. One shortcoming of these detection language processing models (i.e., SLMs and LLMs) is that they do not maintain inspection state. Therefore, they lose context when the GenAI model response is streamed as well as between user prompts and GenAI model responses. This loss of context limits the performance of the detection models. Accordingly, improvements are needed.

SUMMARY

To address the limitations described above, the present technology includes methods and systems for adding context to the detection system to improve results from the detection language processing models. Several different approaches are discussed herein.

In a network security system (NSS) that can intercept interactions between endpoints and GenAI models, the NSS inspects the GenAI interaction traffic to enforce policies to ensure the interaction does not violate ethical, security, or privacy policies (collectively referred to as security policies herein). In a first approach, the NSS includes a GenAI analysis component that has a detection language processing model (e.g., an LLM or SLM). The GenAI analysis component receives the prompts and responses of the interaction as they arrive. For example, the NSS extracts the prompts and responses sent in payload data of network packets sent between the endpoint and the GenAI model. The GenAI analysis component stores the data as chunks in a buffer as the data arrives. The GenAI component selects a batch of the chunks by applying a sliding window to the buffer to select a target chunk and a number of preceding chunks. The preceding chunks provide context for the target chunk. The batch of chunks is input to the detection model, and the detection model provides a detection result for the batch. The GenAI analysis component advances the sliding window to the next chunk in serial order as the target chunk to obtain the next batch. Note that the previous target chunk is included in the batch for the new target chunk, and the previous target chunk now provides context for the new target chunk. The GenAI analysis component inputs the new batch to the detection model and receives a detection result for the new chunk. This process repeats until all chunks are analyzed, and the process is performed in near real time. In other words, when a new chunk arrives, the GenAI analysis component advances the sliding window to obtain the next batch and evaluate it with the detection model. As the interaction proceeds and the detection results for each chunk are obtained, the GenAI analysis component sends the detection results to the security policy enforcement component to enforce a security policy on the interaction as it unfolds. In this way, security actions can interrupt or terminate an interaction that violates security policies. The unique advantage of the sliding window approach is that it allows the NSS to achieve context awareness without requiring the detection model (SLM and LLM) to be stateful.

In various embodiments, parameters of the GenAI analysis component can be dynamically adjusted. For example, the size of the chunks or the size of the sliding window can be changed depending on a risk analysis. When chunks are smaller, the resources used are lower, but the detection rate is not as strong. Similarly, when the size of the sliding window is smaller, each chunk is included in fewer batches, so the resources used are lower, but the detection rate is not as strong. In some embodiments, a user risk score of the user engaging in the interaction, an application risk score of the GenAI model, or both can be used to analyze whether to increase or decrease the size of each chunk or the size of the sliding window for a given interaction. Another variation includes using both a detection LLM and a detection SLM to process each batch. The detection results from each detection model can be sent to the security policy enforcement component. A heuristics detection module and a pattern matching detection module may also evaluate each target chunk and provide detection results for the security policy enforcement component to consider. In such an embodiment, an analysis component may coalesce the results to provide a single result for the target chunk to the security policy enforcement component.

In another approach, the GenAI analysis component uses detection results of one or more chunks to provide the context awareness for the evaluation of a target chunk. In an embodiment using such an approach, the GenAI analysis component receives the prompts and responses of the interaction as they arrive. The GenAI analysis component stores the data as chunks in a buffer as the data arrives. The GenAI analysis component generates an input for each target chunk that includes the target chunk and the detection result for the preceding chunk. The chunks are evaluated in serial order, so the preceding chunk detection result from the detection model is obtained as soon as the preceding chunk is evaluated, and it is added to the input for the target chunk, and that input is submitted to the detection model. In some embodiments, more than one preceding chunk detection result is included to improve accuracy at the cost of increased resource usage. The number of preceding chunk detection results to include may be dynamically selected based on the user risk score, the application risk score, or both. In addition to adding each target chunk detection result to the input for the next chunk analysis, the GenAI analysis component provides the detection result for each target chunk to the security policy enforcement component as it is generated. The security policy enforcement component uses each target chunk detection result to continue to apply the security policy to the interaction as it unfolds.

In another embodiment of the approach to use detection results of one or more chunks to provide context awareness to detection language processing model evaluations, the GenAI analysis component receives the prompts and responses of the interaction as they arrive. The GenAI analysis component stores the data as chunks in a buffer as the data arrives. The GenAI analysis component uses a heuristics detection module, a pattern matching detection module, or both to evaluate the target chunk. The results of the heuristics detection module and pattern matching detection module provide the context awareness for the target chunk evaluated by the detection language processing models. This is because the heuristics and pattern matching detection modules automatically maintain the previous inspection state. Incorporating their detection results provides some context awareness to the detection language processing models (e.g., LLMs, SLMs, or both). Accordingly, after obtaining the heuristics detection result and the pattern matching detection result, the GenAI analysis component generates an input for the language processing model that includes the target chunk along with the heuristics detection result, the pattern matching detection result, or both. The language processing model can evaluate the input and provide a target chunk detection result. All detection results for the target chunk can be sent to the security policy enforcement component or coalesced by the GenAI analysis component to send a single detection result. The security policy enforcement component can use each detection result to enforce the security policy on the interaction as it unfolds.

In another embodiment of the approach to use detection results of one or more chunks to provide context awareness to detection language processing model evaluations, the GenAI analysis component receives the prompts and responses of the interaction as they arrive. The GenAI analysis component stores the data as chunks in a buffer as the data arrives. The GenAI analysis component submits each chunk in serial order as they arrive to the language processing model. As detection results are obtained from the language processing model for a target chunk, the detection result for the target chunk and the detection result for the preceding chunk are provided to a verdict engine. The verdict engine analyzes the detection results and generates a final result for the target chunk. In this way, the detection result for the preceding chunk provides the context awareness for the target chunk evaluation. In some embodiments, more than one preceding chunk detection result is submitted with each target chunk detection result to the verdict engine to improve detection results for the target chunk. The target chunk verdict from the verdict engine is provided to the security policy enforcement component to enforce the security policy on the interaction as the interaction unfolds.

In another embodiment of the approach to use detection results of one or more chunks to provide context awareness to detection language processing model evaluations, the GenAI analysis component receives the prompts and responses of the interaction as they arrive. The GenAI analysis component stores the data as chunks in a buffer as the data arrives. The GenAI analysis component submits each chunk in serial order as they arrive at the language processing model as well as to other detection modules including at least a heuristics detection module or a pattern detection module. As detection results are obtained from the language processing model and the other detection modules for a target chunk, the detection result for the target chunk from each detection module and the detection language processing model are provided as one input to a verdict engine to get a verdict for the target chunk. The verdict engine analyzes the detection results and generates a final result (i.e., verdict) for the target chunk. In this way, the detection result from the heuristics detection module and/or the pattern matching module provides the context awareness for the target chunk evaluation. In some embodiments, multiple detection modules are used such that the detection language processing model is an LLM, a second detection module includes an SLM, a third detection module includes a pattern matching module and a fourth detection module includes a heuristics detection module. The target chunk verdict from the verdict engine is provided to the security policy enforcement component to enforce the security policy on the interaction as the it unfolds.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings.

FIG. 5 illustrates a method of analyzing GenAI traffic with a sliding window for context awareness, according to some embodiments.

FIG. 10 illustrates method of analyzing GenAI traffic using detection results of one or more chunks for context awareness, according to some embodiments.

DETAILED DESCRIPTION

Figure 1:
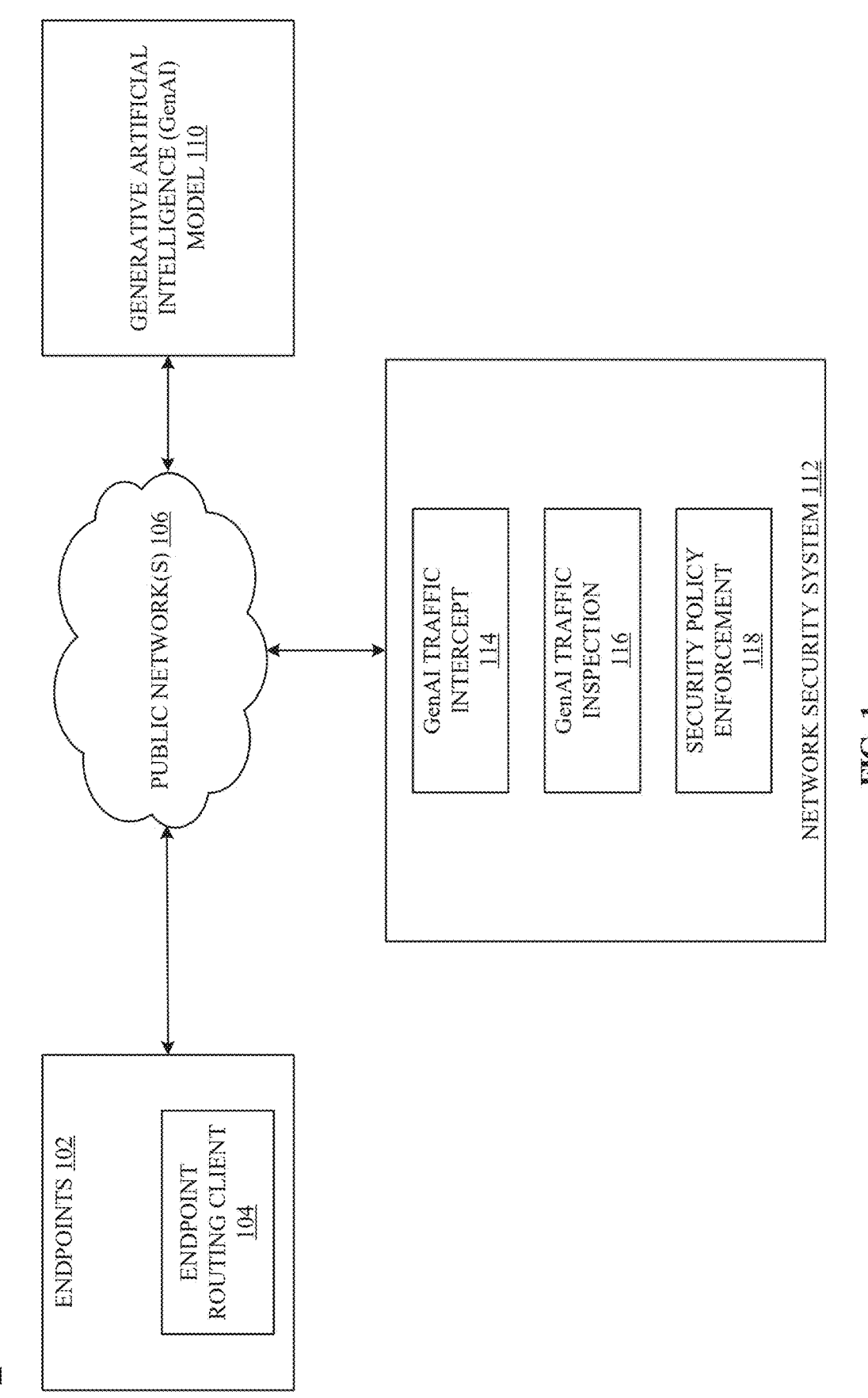
FIG. 1 illustrates a security environment including a network security system that performs GenAI traffic inspection, according to some embodiments.

As described above, GenAI technologies such as LLMs are improving productivity and are increasingly adopted. However, the security, privacy, and ethical challenges are unique. To address these challenges, security systems (e.g., man-in-the-middle security products) are deployed between the endpoint and the GenAI model. The security system intercepts the bi-directional traffic, extracts the original user prompts and GenAI model responses, and inspects the prompts and responses for policy violations (i.e., performs content inspection). To perform the content inspection, multiple different technologies may be used including pattern matching, heuristics, and language processing models. The language processing models can include natural language processing models, often referred to as small language models (SLMs) in current parlance. The language processing models can also include LLMs. Note that the detection LLM is often a dedicated LLM for detection inside the security system. The detection LLM is generally not the same LLM as the GenAI model with which the endpoint interacts.

Basic implementation of the security system involves performing content inspection on the individual user prompts and GenAI model responses one-by-one. However, to be able to achieve high detection efficacy, the context of the user prompts and the GenAI model responses are needed by the detection language processing models (e.g., SLMs and LLMs). The context awareness is lost in two primary situations.

The first situation is when the GenAI model response is streamed. In a basic mode, the user asks a question (i.e., the user prompt), and the GenAI model provides an answer (i.e., the GenAI model response). However, when the answer becomes long, the user experience suffers if the response is sent back in one shot. To address this user experience issue, most modern GenAI models (e.g., OPEN AI CHATGPT, MICROSOFT COPILOT, and the like) support a streaming mode which provides long answers in multiple small chunks. The small chunks are displayed to the user as they arrive, which improves the user experience substantially. However, this streaming mode creates a challenge to perform content inspection without losing context. As a simple example, a particular word or phrase may be a policy violation (e.g., curse words as one example). For this example, we will use the word "violation." In a streamed response, partial words may be sent in a given portion of the response based on the token generation of the GenAI model. Accordingly, a first portion of the response may end with "vio" and the next portion of the response begins with "lation." In such a case, if the language processing model has no context, it will not identify the word "violation."

The second situation is when context is lost across the overall interaction. In some cases, the user sends a single user prompt and the GenAI model provides a single response to the prompt. This is a single conversation. However, even in a single conversation context is lost between the prompt and the response. Further, when multiple conversations happen consecutively (i.e., an interaction), the context is lost between the conversations. In a case where a policy violation may not be identified without analysis of multiple prompts and responses to identify the nature of the overall interaction, without the context awareness, the language processing model will not detect the policy violation.

Across the detection technologies, pattern matching and heuristics are each able to handle streaming mode responses and multiple conversations because they each remember the previous inspection state in their built-in memory. However, the language processing model detection technologies (e.g., SLMs and LLMs) do not have inspection state memory.

To address this issue, the present technologies provide context information in various ways to ensure higher detection efficacy for SLM and LLM detection modules. Two approaches are provided with various implementations described for each. The first approach is a sliding window approach. The network security system intercepts the prompts from an endpoint and the responses from the GenAI model as they are sent across the network. The network security system extracts the prompt and response data from the payload of the network packets and provides it to a GenAI analysis component for GenAI traffic inspection (i.e., content inspection). The data arrives in serial order and is processed in serial order as the interaction between the endpoint and the GenAI model unfolds. The GenAI analysis component receives the data and stores it in chunks in a buffer. The GenAI analysis component applies a sliding window to the chunks as each new target chunk arrives. The sliding window is used to select a number of preceding chunks to include in a batch for the target chunk. An input including the batch is submitted to the language processing model (e.g., detection SLM or LLM) to generate a detection result. The GenAI analysis component provides the detection result for the target chunk to a security policy enforcement component to enforce a security policy on the interaction based at least in part on the detection result for the target chunk. The GenAI analysis component repeatedly advances the sliding window to obtain batches for each target chunk as they arrive until the interaction is complete.

A second approach is to use detection results from one or more chunks to provide the desired context awareness (i.e., multidimensional detection results). In some embodiments, the detection result from the preceding chunk is included in the input along with the target chunk for submission to the language processing model. In some embodiments, the detection results from the target chunk and the preceding chunk are provided to a verdict engine. The verdict engine analyses the detection results to provide, for example, a risk score for the target chunk that the security policy enforcement component uses to apply the security policy. In other words, the security policy enforcement component uses the risk score of each chunk to determine whether the interaction violates the security policy as the interaction unfolds.

Advantageously, providing context to the detection language processing models substantially increases detection rates. The technology described can be implemented to improve detection rates for both LLM detection models and SLM detection models for both streaming responses and across conversations in an interaction. Additionally, the various options described herein provide for dynamic decision making regarding the level of inspection. For example, for less risky users or less risky GenAI models, the system can reduce the resource usage by tuning parameters for the given user or the given GenAI model to allow for less intensive content inspection. Accordingly, the described systems and methods provide for improved detection rates while limiting resource usage.

FIG. 1 illustrates a security environment 100 used to perform context aware GenAI traffic inspection. Security environment 100 includes network security system 112 with the features for performing GenAI traffic inspection with context awareness as described throughout. Security environment 100 includes endpoints 102, public networks 106, GenAI model 110, and network security system 112. Security environment 100 may include additional computing systems not shown here for ease of description. For example, more endpoints 102, more GenAI models 110, other computing systems that access public networks 106, other services accessible over public network 106, and the like may be included.

Endpoints 102 may be user devices including desktops, laptops, mobile devices, and the like. The mobile devices include smartphones, smart watches, and the like. Endpoints 102 may also include internet of things (IOT) devices. Endpoints 102 may include any number of components including those described with respect to computing device 1100 of FIG. 11 including processors, output devices, communication interfaces, input devices, memory, and the like, all not depicted here for clarity. Endpoints 102 may be used to interact with GenAI model 110 and otherwise interact with servers and other devices connected to public network 106. Endpoints 102 include endpoint routing client 104. In some embodiments, endpoint routing client 104 may be a client installed on the endpoint 102. In other embodiments, endpoint routing client 104 may be implemented using a gateway that traffic from each endpoint 102 passes through for transmission out of a private or sub-network. While a single endpoint 102 is shown for simplicity, any number of endpoints 102 may be included in security environment 100. Further, multiple endpoints 102 associated each with one of a number of enterprises or clients of network security system 112 may be included. In some embodiments, a number of endpoints 102 associated with an enterprise may connect to a private network (not shown) that uses, for example, a gateway to access public network 106.

Endpoint routing client 104 routes network traffic transmitted from its respective endpoint 102 to the network security system 112. Depending on the type of device for which endpoint routing client 104 is routing traffic, endpoint routing client 104 may use or be a virtual private network (VPN) such as VPN on demand or per-app-VPN that use certificate-based authentication. For example, for some devices having a first operating system, endpoint routing client 104 may be a per-app-VPN may be used or a set of domain-based VPN profiles may be used. For other devices having a second operating system, endpoint routing client 104 may be a cloud director mobile app. Endpoint routing client 104 can also be an agent that is downloaded using e-mail or silently installed using mass deployment tools. As mentioned above, endpoint routing client 104 may be implemented in a gateway through which all traffic from endpoints 102 travels to leave an enterprise network, for example. In any implementation, endpoint routing client 104 routes traffic generated by endpoints 102 to network security system 112.

Public network 106 may be any public network including, for example, the Internet. Public network 106 couples endpoints 102, GenAI model 110, and network security system 112 such that any may communicate with any other via public network 106. While not depicted for simplicity, public network 106 may also couple many other devices for communication including, for example, other servers, other private networks, other user devices, and the like (e.g., any other connected devices). The communication path can be point-to-point over public network 106 and may include communication over private networks (not shown). In some embodiments, endpoint routing client 104, might be delivered indirectly, for example, via an application store (not shown). Communications can occur using a variety of network technologies, for example, private networks, Virtual Private Network (VPN), multiprotocol label switching (MPLS), local area network (LAN), wide area network (WAN), Public Switched Telephone Network (PSTN), Session Initiation Protocol (SIP), wireless networks, point-to-point networks, star network, token ring network, hub network, Internet, or the like. Communications may use a variety of protocols. Communications can use appropriate application programming interfaces (APIs) and data interchange formats, for example, Representational State Transfer (REST), JavaScript Object Notation (JSON), Extensible Markup Language (XML), Simple Object Access Protocol (SOAP), Java Message Service (JMS), Java Platform Module System, and the like. Additionally, a variety of authorization and authentication techniques, such as username/password, Open Authorization (OAuth), Kerberos, SecureID, digital certificates and more, can be used to secure communications.

GenAI model 110 may include any generative artificial intelligence services and models available on public network 106. GenAI model 110 may include, for example, large language models (LLMs), multimodal models, image generation models, and the like. While Well-known GenAI models include GPT models such as OPEN AI's GPT 3.5, GPT 4.0, and GPT 5.0 and GOOGLE's GEMINI. These models are accessible using front end services, for example, OPEN AI CHATGPT, MICROSOFT COPILOT, OPEN AI DALL-E, GOOGLE GEMINI, and the like. GenAI models 110 are characterized by their ability to generate content in response to a prompt submission. GenAI models are models trained to generate new data based on a training dataset. GenAI models 110 include large-scale generative artificial intelligence (AI) models trained on massive quantities of diverse, unlabeled data. GenAI models learn using self-supervised, semi-supervised, or unsupervised techniques. GenAI models perform many downstream tasks based on capturing general knowledge, semantic representations, and patterns and regularities in the training data. In some embodiments, such as embodiments included herein, a GenAI model may be fine-tuned for specific downstream tasks. GenAI models include BERT (Bidirectional Encoder Representations from Transformers) and ResNet (Residual Neural Network). GenAI models may be based on any relevant architecture, including, for example, generative adversarial networks (GANs), variational auto-encoders (VAEs), and transformer models, including multimodal transformer models. Depending on the type of input accepted and output provided, GenAI models may be multimodal or unimodal.

Multimodal models are a class of GenAI model that accepts multimodal data including text, image, video, and audio data. Multimodal models may leverage techniques like attention mechanisms and shared encoders to fuse information from different modalities and create joint representations. Learning joint representations across different modalities enables multimodal models to generate multimodal outputs that are coherent, diverse, expressive, and contextually rich. For example, multimodal models can generate a caption or textual description of a given image by extracting visual features using an image encoder, then feeding the visual features to a language decoder to generate a descriptive caption. Similarly, multimodal models can generate an image based on a text description (or, in some scenarios, a spoken description transcribed by a speech-to-text engine). Multimodal models work in a similar fashion with video-generating a text description of the video or generating video based on a text description.

Multimodal models include visual-language foundation models, such as CLIP (Contrastive Language-Image Pre-training), ALIGN (A Large-scale ImaGe and Noisy-text embedding), and VILBERT (Visual-and-Language BERT), for computer vision tasks. Examples of visual multimodal or foundation models include DALL-E, DALL-E 2, Flamingo, Florence, and NOOR. Types of multimodal models may be broadly classified as or include cross-modal models, multi-modal fusion models, and audio-visual models, depending on the particular characteristics or usage of the model.

Large language models (LLMs) are a type of GenAI model that process and generate natural language text. These models are trained on massive amounts of textual data. LLMs learn to generate relevant responses given a prompt or input text. The responses are coherent and contextually relevant to the given prompt. LLMs understand and generate sophisticated language based on their training. LLMs capture intricate patterns, semantics, and contextual dependencies in textual data. In some cases, LLMs may be used in multimodal models. For example, the LLM intelligence is used to combine images and audio input with textual input to generate multimodal output. Types of LLMs include language generation models, language understanding models, and transformer models.

Transformer models, including transformer-type foundation models and transformer-type LLMs, are a class of deep learning models used in natural language processing (NLP). Transformer models are based on a neural network architecture which uses self-attention mechanisms to process input data and capture contextual relationships between words in a sentence or text passage. Transformer models weigh the importance of different words in a sequence, allowing them to capture long-range dependencies and relationships between words. GPT (Generative Pre-trained Transformer) models, BERT (Bidirectional Encoder Representations from Transformer) models, ERNIE (Enhanced Representation through kNowledge Integration) models, T5 (Text-to-Text Transfer Transformer), and XLNet models are types of transformer models which have been pretrained on large amounts of text data using a self-supervised learning technique called masked language modeling. For example, large language models, such as ChatGPT and its brethren, have been pretrained on an immense amount of data across virtually every domain of the arts and sciences. This pre-training allows the models to learn a rich representation of language that can be fine-tuned for specific NLP tasks, such as text generation, language translation, or sentiment analysis. Moreover, these models have demonstrated emergent capabilities in generating responses that are creative, open-ended, and unpredictable.

Network security system 112 may provide network security services to endpoints 102. Endpoint routing client 104 may route traffic addressed to GenAI model 110 from endpoints 102 to network security system 112 to enforce security policies. Based on the security policy enforcement, the traffic may then be routed to the addressed GenAI model 110, blocked, modified, or the like. While network security system 112 is shown as connected to endpoints 102 via public network 106, in some embodiments, network security system 112 may be on a private network with endpoints 102 to manage network security on premises. Network security system 112 may implement security management for endpoints 102. The security management may include protecting endpoints 102 from various security threats and vulnerabilities including enforcing privacy, security, and ethical concerns with respect to interactions with GenAI model 110. For simplicity, the features of network security system 112 related to context aware GenAI traffic inspection are shown while other security features are not described in detail. In some embodiments, network security system 112 may be implemented as a cloud-based service and accordingly may be served by one or more server computing systems that provide the cloud-based services that are distributed geographically across data centers. In other embodiments, network security system 112 can be implemented on premises for an enterprise. As such, network security system 112 may be implemented in any computing system or architecture that can provide the described capabilities without departing from the scope of the present disclosure. Network security system 112 may include, among other security features, GenAI traffic intercept 114, GenAI traffic inspection 116, and security policy enforcement 118. While a single network security system 112 is depicted for simplicity, any number of network security systems 112 may be implemented in security environment 100 and may include multiple instances of GenAI traffic intercept 114, GenAI traffic inspection 116, and security policy enforcement 118 for handling multiple clients or enterprises on a per/client basis, for example.

GenAI traffic intercept 114 may utilize a proxy (e.g., a reverse or forward proxy) to intercept network traffic between endpoints 102 and various domain servers including GenAI models 110. A component associated with the proxy may identify GenAI traffic. For example, the traffic may be filtered based on the destination (e.g., using a list of known GenAI models) or based on any other suitable indicator. Once the GenAI traffic is identified, GenAI traffic intercept 114 extracts the payload from the network packets to isolate the prompts and responses included in the payloads. Once the prompts and responses are extracted, GenAI traffic intercept 114 provides them to GenAI traffic inspection 116. GenAI traffic intercept 114 processes the traffic in serial order as it arrives. Accordingly, GenAI traffic intercept 114 continuously extracts and sends the prompts and responses to GenAI traffic inspection for content inspection as the traffic flows. Further, traffic between multiple endpoints 102 and multiple GenAI models 110 may be handled by GenAI traffic intercept 114. Accordingly, GenAI traffic intercept 114 and GenAI traffic inspection 116 use metadata to process all traffic for a particular interaction between a given endpoint 102 and a given GenAI model 110 to maintain the proper context across the particular interaction. For example, GenAI traffic intercept 114 may assign an interaction identifier to all data associated with a given interaction or unique information from the communication, such as a transport layer security (TLS) identifier may be used.

GenAI traffic inspection 116 performs content inspection of the prompts and responses of the GenAI traffic received from GenAI traffic intercept 114. The content inspection utilizes one or more language processing models (e.g., LLMs or SLMs) for which context is maintained as described in the various embodiments depicted and described with respect to FIGS. 2, 3, and 6-9. As the content of the GenAI traffic is inspected, detection results are generated by GenAI traffic inspection 116. The detection results are provided to security policy enforcement 118.

Security policy enforcement 118 enforces security policies on traffic, including bi-directional GenAI traffic, intercepted by network security system 112 and particularly by GenAI traffic intercept 114. Security policy enforcement 118 may identify security policies to apply to the traffic based on, for example, the user account associated with the endpoint 102 (i.e., user device), the destination server addressed, the type of communication protocol used, the type of transaction (e.g., document download, document upload, login transaction, or the like), data included in the traffic (e.g., data in the packet), or any combination. More specifically for GenAI traffic inspection, security policies may be applied based on the detection results from GenAI traffic inspection 116 as described in more detail with respect to the following FIGS. For example, if GenAI traffic inspection 116 identifies an issue in the GenAI interaction, security policy enforcement 118 may block the remainder of the interaction, issue notifications, adjust user and application risk scores, and the like. In some embodiments, other security actions may be performed, other security policies may be applied based on the identified issue, or the like. The security policies may include GenAI traffic specific policies as well as any other security policies implemented by the organization or entity. Accordingly, security policy enforcement 118 may identify and enforce any other security policies (e.g., security policies other than those related to GenAI traffic inspection). After applying the security policies, the inspected portion of the interaction may be blocked, modified, or transmitted to the destination address specified in the network packet.

In use, endpoint 102 generates an outgoing transaction to a GenAI model 110 that includes a prompt. Endpoint routing client 104 routes the outgoing transaction to network security system 112. Network security system 112 intercepts the outgoing transaction with GenAI traffic intercept 114 which may include a proxy. GenAI traffic intercept 114 extracts the data payload (i.e., the prompt) from the outgoing transaction and provides it to GenAI traffic inspection 116. GenAI traffic inspection 116 inspects the data as described in more detail in the following FIGS. and generates a detection result for the prompt. Security policy enforcement 118 enforces relevant security policies, some of which are related to GenAI traffic inspection. When the prompt is deemed to not violate policies, Security policy enforcement releases that portion of the interaction for transmission, and network security system 112 sends the prompt to GenAI model 110. When GenAI model 110 responds, network security system 112 intercepts the response. GenAI traffic intercept 114 extracts the response or portion of the response and provides it to GenAI traffic inspection 116. GenAI traffic inspection 116 analyzes the response using context from the prompt to improve the detection results, as described in more detail throughout. This process continues for all portions of the response and follow-on conversations (i.e., prompt and response) of the interaction until the interaction completes.

Figure 2:
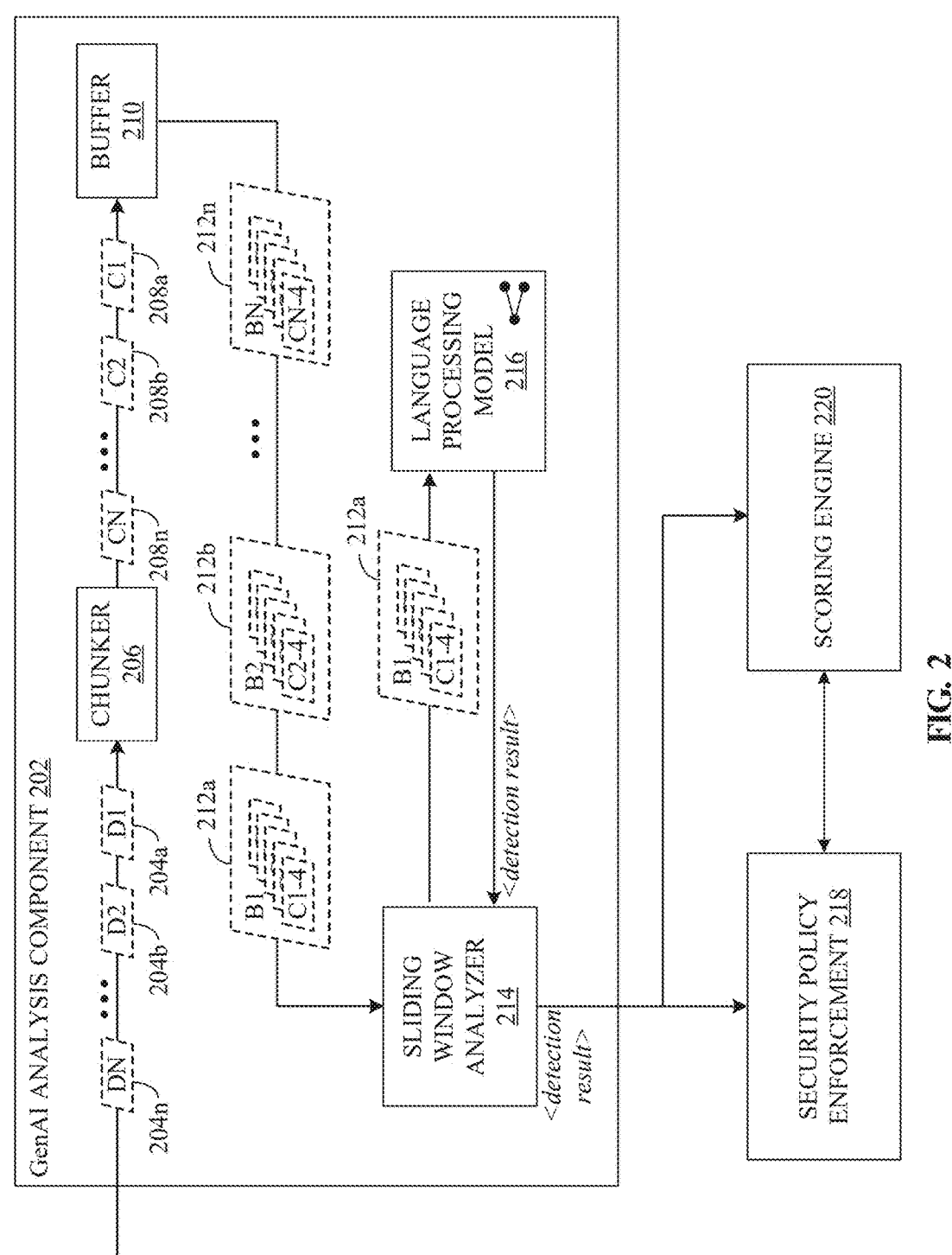
FIG. 2 illustrates an example portion of the network security system of FIG. 1 for performing context aware GenAI traffic inspection using a sliding window, according to some embodiments.

FIG. 2 illustrates security system 200, which is generally representative of a portion of network security system 112 in some embodiments. Security system 200 includes GenAI analysis component 202, scoring engine 220, and security policy enforcement 218. Security system 200 includes other components, such as an interception component such as GenAI traffic intercept 114 described in FIG. 1, which are not depicted or described here for brevity.

GenAI analysis component 202 is generally representative of at least a portion of GenAI traffic inspection 116. GenAI analysis component 202 includes chunker 206, buffer 210, sliding window analyzer 214, and language processing model 216. FIG. 2 shows the dataflow of content inspection within GenAI analysis component 202.

Chunker 206 receives data blocks 204 as they are provided in serial order from GenAI traffic intercept 114.

Example data blocks 204a and 204b through 204n (indicating any number of data blocks) arrive at chunker 206 in serial order. Chunker 206 creates chunks 208 from data blocks 204 and stores them in buffer 210. Chunks 208 are fixed size chunks of portions of the data from the interaction between an endpoint 102 and a GenAI model 110. In some embodiments, data blocks 204 are the size of chunks 208. In some embodiments, when data blocks 204 arrive that are smaller than the chunk size of chunks 208, the remainder of the chunk is padded with null data. In some embodiments, when data blocks 204 arrive that are larger than the chunk size of chunks 208, the data block 204 is divided into two or more chunks 208. As depicted in FIG. 2, chunker 206 generates chunks 208a and 208b through 208n (indicating any number of chunks) in serial order from data blocks 204.

Buffer 210 is memory for storing chunks 208 during processing by GenAI analysis component 202. Buffer 210 can be a volatile memory that has fast access and is sized to accommodate the expected flow of GenAI traffic for which inspection is performed.

Sliding window analyzer 214 applies a sliding window to each chunk 208 in serial order as they arrive in buffer 210. The chunk 208 to which the sliding window is applied is the target chunk, and a number of preceding chunks in serial order fall within the sliding window. Sliding window analyzer 214 selects the chunks 208 that fall within the sliding window to create batches 212. The sliding window is a fixed size window that selects a number of chunks 208 such that the preceding chunks included in a batch provide context awareness for the target chunk. The sliding window is shown in more detail in FIG. 4. As depicted in FIG. 2, batches 212a and 212b through 212n (indicating any number of batches) are generated in serial order. In the example of FIG. 2, each batch includes the target chunk (e.g., C10) and the four chunks immediately preceding the target chunk (e.g., C9-C6) so that each batch includes five chunks 208.

Language processing model 216 is a model for detecting issues in batches 212. Language processing model 216 may be a large language model (LLM) or a small language model (SLM), both of which are generative artificial intelligence models. In either case, language processing model 216 is not the same GenAI model 110 the endpoint 102 is interacting with. LLMs were described in detail above with respect to FIG. 1. Small language models (SLMs), also known as natural language models or language processing models, are compact versions of large language models (LLMs) and are also designed to understand and generate human language. Like LLMs, SLMs are trained on diverse text data. SLMs may be optimized to perform tasks such as text classification, sentiment analysis, summarization, and conversational interaction-often with fewer computational resources than LLMs. Despite their smaller size, SLMs can be highly efficient and effective for specific applications, especially when deployed on edge devices or in environments with limited processing power. The reduced complexity of SLMs also makes them easier than LLMs to fine-tune for domain-specific tasks. Therefore, SLMs provide a balance between performance, speed, and accessibility.

Language processing model 216 outputs a response to an input from sliding window analyzer 214 that indicates whether the target chunk, with the context awareness of the preceding chunks, includes an issue. Because language processing model 216 is easily configured with natural language of the input to provide its response in any particular way desired, the output is a detection result that could include a score, a natural language result, or a response in a structured format such as JSON. Sliding window analyzer 214 handles the response in any format as it is designed to.

Sliding window analyzer 214 generates the input including a request to analyze a given batch (e.g., batch 212a as depicted). The input includes the batch and the request, and the input is submitted to language processing model 216. In some embodiments, the input includes a format for response. For example, the input can request the response (i.e., the detection result) in the form of a risk score, in a structured format (e.g., JSON format), or the like. Language processing model 216 generates a detection result for the target chunk. Sliding window analyzer 214 provides the detection result for the target chunk to security policy enforcement 218 and, in some embodiments, scoring engine 220. With this approach, the chunks 208 are each included in more than one batch 212. For example, with a sliding window size of five chunks, each batch 212 has a target chunk and four additional chunks to provide context awareness to language processing model 216 for the target chunk. In such an example, if chunk G is the target chunk, chunks C-F are provided as the context chunks. When each of chunks H through K are the target chunk, chunk G will also be included in the batches. Therefore, chunk G will be submitted to language processing model 216 five separate times in five separate batches 212.

Security policy enforcement 218 is generally representative of security policy enforcement 118 of FIG. 1. Security policy enforcement 218 applies security policies to interactions based at least in part on detection results for each target chunk. For example, if a policy violation is detected, security policy enforcement 218 can terminate the interaction, block further transmission of messages in the interaction, transmit notifications to the user of endpoint 102, transmit notifications to an administrator, provide an indication to scoring engine 220, or any combination thereof, including other security actions.

Scoring engine 220 may score users and applications based on detection results for one or more target chunks, information from security policy enforcement 218, or the like. For example, if a detection result or if security policy enforcement 218 provides an indication that there is an issue between an endpoint 102 and a GenAI model 110, a user risk score for the user associated with the interaction and/or an application risk score associated with the GenAI model 110 may be increased. Conversely, if the indication is that there are no issues, the user risk score and/or application risk score may be decreased.

In some embodiments, the user risk score, the application risk score, or a combination may be used to modify adjustable parameters of the GenAI analysis component 202. Adjustable parameters can include the size of the chunks 208 for the given interaction, the size of the sliding window for the given interaction, and the like. Decreasing the size of the chunk and/or the size of the sliding window reduces the detection rate but also decreases resource usage. Accordingly, for a relatively low risk interaction involving a user on an endpoint 102 with a low risk score interacting with a GenAI model 110 having a low risk score, resource usage of the system can be improved (i.e., reduced) by reducing the size of the chunks and/or the size of the sliding window.

Figure 3:
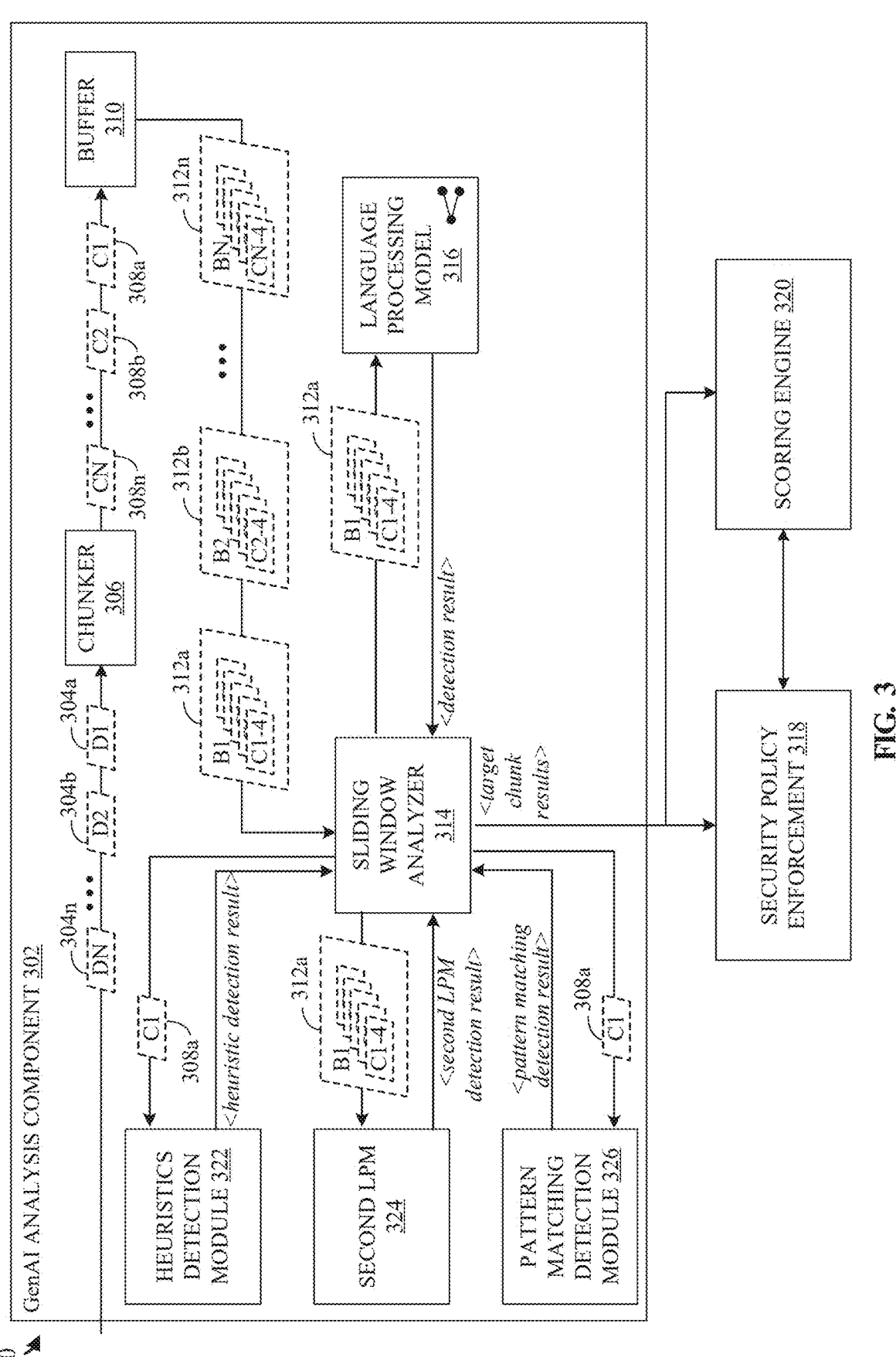
FIG. 3 illustrates another example portion of the network security system of FIG. 1 for performing context aware GenAI traffic inspection using a sliding window, according to some embodiments.

FIG. 3 illustrates security system 300, which is generally representative of a portion of network security system 112 in some embodiments. Security system 300 includes GenAI analysis component 302, scoring engine 320, and security policy enforcement 318. Security system 300 includes other components, such as an interception component such as GenAI traffic intercept 114 described in FIG. 1, which are not depicted or described here for brevity.

GenAI analysis component 302 is generally representative of at least a portion of GenAI traffic inspection 116 of FIG. 1. GenAI analysis component 302 uses the sliding window approach like the one described in FIG. 2. However, GenAI analysis component 302 includes heuristics detection module 322, second language processing model 324, and pattern matching detection module 326 in addition to chunker 306, buffer 310, sliding window analyzer 314, and language processing model 316.

Chunker 306 is generally representative of chunker 206, buffer 310 is generally representative of buffer 210, and language processing model 316 is generally representative of language processing model 216. As such, example data blocks 304a and 304b through 304n (indicating any number of data blocks) arrive at chunker 306 in serial order. Chunker 306 creates chunks 308 from data blocks 304 and stores them in buffer 310. Chunks 308 are fixed size chunks of portions of the data from the interaction between an endpoint 102 and a GenAI model 110. In some embodiments, data blocks 304 are the size of chunks 308. In some embodiments, when data blocks 304 arrive that are smaller than the chunk size of chunks 308, the remainder of the chunk is padded with null data. In some embodiments, when data blocks 304 arrive that are larger than the chunk size of chunks 308, the data block 304 is divided into two or more chunks 308. As depicted in FIG. 3, chunker 306 generates chunks 308a and 308b through 308n (indicating any number of chunks) in serial order from data blocks 304 and stores them in buffer 310.

Heuristics detection module 322 analyzes an input including a target chunk to identify suspicious or anomalous behavior with relatively low resource usage. Heuristics detection module 322 may include, for example, rule-based algorithms that include predefined logic or conditions used to identify anomalies. This type of heuristic detection is a known form of analysis that maintains state between chunks.

Second language processing model 324 analyzes the same batch 312 as language processing model 316 to generate results for the target chunk in batch 312. However, if language processing model 316 is an LLM, second language processing model 324 is an SLM, and vice versa. In other words, having two language processing models allows GenAI analysis component 302 to utilize the benefits of both an LLM analysis and an SLM analysis of the target chunk.

Pattern matching detection module 326 analyzes an input including a target chunk to identify known signatures of concern in the input. Such analysis includes searching the target chunk for strings or patterns for known issues. This type of signature and pattern matching is a known form of analysis. Further, pattern matching maintains state between chunks.

Sliding window analyzer 314 applies a sliding window to each chunk 308 in serial order as they arrive in buffer 310, as described for sliding window analyzer 214 of FIG. 2. Accordingly, sliding window analyzer 314 generates batches 312a and 312b through 312n in serial order as chunks 308 are stored in buffer 310. Sliding window analyzer 314 creates the batches 312 each having a target chunk and generates the input to language processing model 316. The input to language processing model 316 may be the same as described regarding the input to language processing model 216. Sliding window analyzer 314 also generates inputs for heuristics detection module 322, second language processing model 324, and pattern matching detection module 326. Sliding window analyzer 314 submits inputs to heuristics detection module 322 and pattern matching detection module 326 each including the target chunk (e.g., chunk 308a when batch 312a is the processed batch) for analysis. Further, the batch 312 submitted in the input to language processing model 316 is also submitted in the input to second language processing model 324. When sliding window analyzer 314 receives the results from each of language processing model 316, heuristics detection module 322, second language processing model 324, and pattern matching detection module 326, it submits all the results of the target chunk (i.e., the target chunk detection results) to security policy enforcement 318 and, in some embodiments, scoring engine 320. In some embodiments, sliding window analyzer 314 includes a verdict engine that combines the target chunk results and generates a single verdict for the target chunk providing, for example, a score for the target chunk. The score may indicate a level of risk that the target chunk includes one or more concerning issues.

Security policy enforcement 318 is generally representative of security policy enforcement 118 and 218 described above. Security policy enforcement 318 applies security policies to the interaction based on the target chunk results received from sliding window analyzer 314. Security policy enforcement 318 performs security actions as defined within the security policy when security violations are identified. Security actions can include terminating the interaction, sending notifications, and the like as discussed in more detail with respect to FIGS. 1 and 2.

Scoring engine 320 is generally representative of scoring engine 220 as described above. The user risk score and/or application risk score can be used to modify the adjustable parameters as discussed with respect to FIG. 2. Further, in the embodiment of GenAI analysis component 302, another adjustment may be whether or not to use second language processing model 324. Processing each batch 312 with two language processing models is resource intensive, so only processing the batches with one of the language processing models saves resources but reduces the detection rate. For low-risk users or applications, this tradeoff may improve the overall performance of GenAI analysis component 302. For example, for users having a user risk score below a threshold value, GenAI models 108 having an application risk score below a threshold, or combinations falling below a threshold, the adjustments to use only one language processing model, reduce the size of chunks 308, reduce the size of the sliding window, or some combination of them may be helpful to improve performance with low risk.

Figure 4:
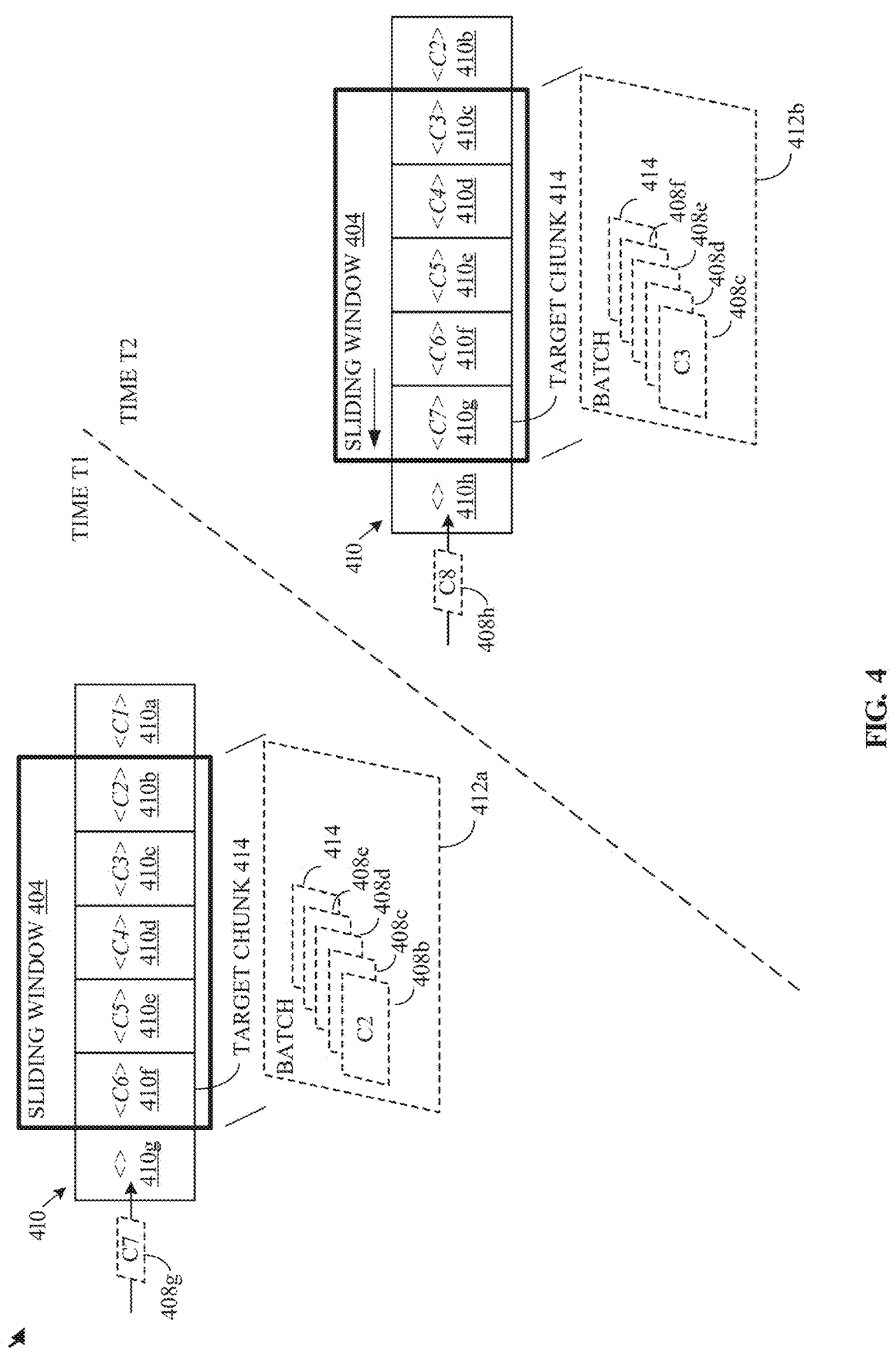
FIG. 4 illustrates an example sliding window operational scenario, according to some embodiments.

FIG. 4 illustrates operational scenario 400 depicting buffer 410 at time T1 and time T2. Buffer 410 may be generally representative of buffer 210 and buffer 310 depicted and described with respect to FIGS. 2 and 3. Chunks 408 are generally representative of chunks 208 and 308 depicted and described with respect to FIGS. 2 and 3. Batches 412a, 412b are generally representative of batches 212 and 312 depicted and described with respect to FIGS. 2 and 3.

Sliding window 404 is the sliding window applied by the sliding window analyzer (e.g., sliding window analyzer 214, 314) to buffer 410. In operational scenario 400, the sliding window is sized for five chunks such that the target chunk and the four immediately preceding chunks fall into sliding window 404.

At time T1, buffer 410 includes memory block 410a storing chunk C1, memory block 410b storing chunk C2, memory block 410c storing chunk C3, memory block 410d storing chunk C4, memory block 410e storing chunk C5, and memory block 410f storing chunk C6. At time T1, chunk 408g (C7) is being stored in memory block 410g. Sliding window 404 is positioned over (i.e., applied to) the most recent chunk to arrive in serial order, which is C6 stored in memory block 410f, which is the target chunk 414 for this iteration of the application of sliding window 404. Chunks C2-C5 fall within sliding window 404 to provide context awareness for chunk C6 as target chunk 414. Accordingly, batch 412a includes Chunk C2 408b, chunk C3 408c, chunk C4 408d, chunk C5 408e, and target chunk C6 414.

At time T2, Chunk C7 408g is stored in memory block 410g of buffer 410, and chunk C8 408h is being stored in memory block 410h of buffer 410. Accordingly, sliding window analyzer advances sliding window 404 to apply it to chunk C7 in memory block 410g as the target chunk 414. Chunks C3-C6 now fall within sliding window 404 to provide context awareness for chunk C7 as target chunk 414. Accordingly, batch 412b includes chunk C3 408c, chunk C4 408d, chunk C5 408e, chunk C6 408f, and target chunk C7 414.

This process repeats as new chunks 408 arrive in buffer 410 until the interaction is complete, either because endpoint 102 and GenAI model 108 end the interaction or because security policy enforcer 118 terminates the interaction. Further, as chunks 408 are no longer needed, memory blocks in buffer 410 can be overwritten and reused to store new chunks 408.

FIG. 5 illustrates method 500, which can be performed by network security system 112 implementing security system portion 200 or security system portion 300 for GenAI traffic inspection 116. Method 500 may include additional steps, the steps may be performed repeatedly, in any order, or in parallel to process multiple interactions between various endpoints 102 and GenAI models 110. Method 500 includes step 502 which is receiving, by a network security system (NSS) interposed on a network between an endpoint and a generative artificial intelligence (GenAI) model, an interaction between the endpoint and the GenAI model, wherein data of the interaction arrives at the NSS in serial order. For example, NSS 112 intercepts communications between endpoint 102 and GenAI model 110. GenAI traffic intercept 114 obtains the communication packets and strips the payloads out to identify the prompts and responses and provides them to GenAI traffic inspection 116. GenAI traffic inspection 116 implementing GenAI analysis component 202 or 302 receives the data of an interaction in serial order.

Method 500 further includes step 504 in which the interaction is analyzed. Step 504 includes substeps 506-512. Substep 506 includes storing the data of the interaction in chunks in serial order as the data arrives. For example, chunker 206, 306 receives data blocks 204, 304 and generates chunks 208, 308 and stores the chunks in buffer 210, 310.

Substep 508 includes selecting a batch of the chunks, including the target chunk, that fall within a sliding window based on applying the sliding window to the target chunk such that a number of chunks preceding the target chunk in serial order fall within the sliding window. For example, sliding window analyzer 214, 314 applies sliding window 404 to a target chunk 414 in buffer 410, 310, 210 to generate a batch 212, 312, 412 that includes the target chunk 414 and a number of the immediately preceding chunks in serial order. In the examples depicted, batches include five chunks (i.e., the target chunk and the four immediately preceding chunks in serial order). However, sliding window 404 can be sized to include more or fewer chunks. Further, the chunk size and/or the size of the sliding window can be adjusted to tune the system or based on user risk scores and/or application risk scores for a given interaction.

Substep 510 includes evaluating the batch of the chunks with a detection module of the NSS, wherein the detection module comprises a language processing model, and the chunks preceding the target chunk provide context awareness to the language processing model for the target chunk. For example, each batch 212, 312, 412 are evaluated by language processing model 216, 316. Using batch 412*a* as an example, chunks 408*b*-408*e*, which equate to the data stored in memory blocks 410*b*-410*e*, provide context awareness to the language processing model for the target chunk 414, which equates to the data stored in memory block 410*f*.

Substep 512 includes repeatedly advancing the sliding window from the target chunk to the next chunk in serial order to select the next batch of chunks to evaluate with the detection module. For example, as shown in FIG. 4, the sliding window analyzer advances sliding window 404 from memory block 410*f* to memory block 410*g* when chunk C7 408*g* is fully stored in memory block 410*g*.

Method 500 further includes step 514, which includes applying, by the NSS, a security policy to the interaction based at least in part on results of the analyzing the interaction. For example, security policy enforcement 118, 218, 318 applies security policies to the interactions based on the detection results from GenAI analysis component 202, 302 or GenAI traffic inspection 116.

Figure 6:
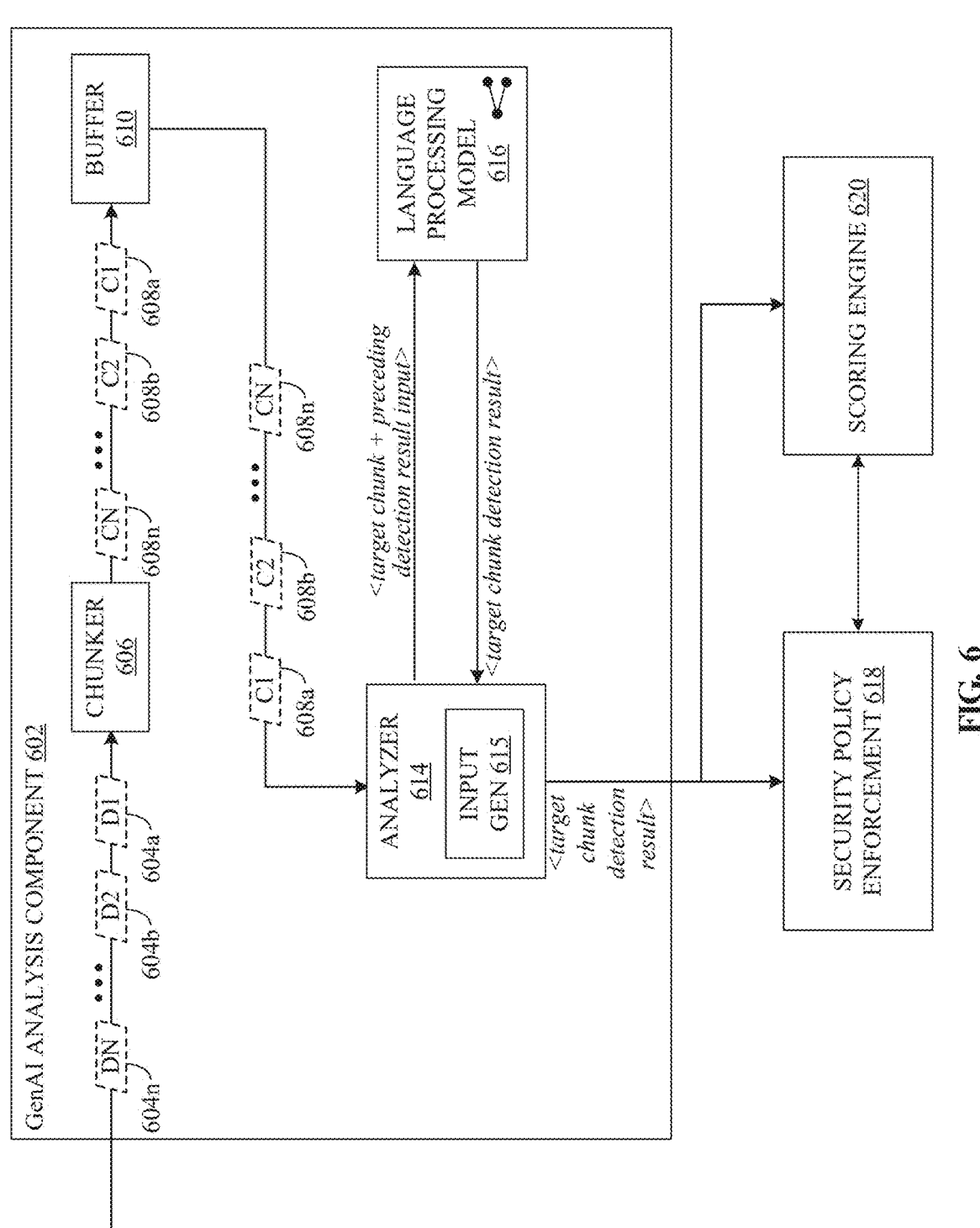
FIG. 6 illustrates an example portion of the network security system of FIG. 1 for performing context aware GenAI traffic inspection using preceding chunk detection results, according to some embodiments.

FIG. 6 illustrates security system 600, which is generally representative of a portion of network security system 112 in some embodiments. Security system 600 includes GenAI analysis component 602, scoring engine 620, and security policy enforcement 618. Security system 600 includes other components, such as an interception component such as GenAI traffic intercept 114 described in FIG. 1, which are not depicted or described here for brevity. Security policy enforcement 618 is generally representative of security policy enforcement 118, 218, 318, and scoring engine 620 is generally representative of scoring engine 220, 320.

GenAI analysis component 602 is generally representative of at least a portion of GenAI traffic inspection 114 of FIG. 1. GenAI analysis component 602 uses the other chunk detection results approach to provide context awareness for language processing model 616. GenAI analysis component 602 includes chunker 606, buffer 610, analyzer 614, and language processing model 616.

Chunker 606 is generally representative of chunker 206 and 306, buffer 610 is generally representative of buffer 210, 310, and 410, and language processing model 616 is generally representative of language processing model 216 and 316. As such, example data blocks 604*a* and 604*b* through 604*n* (indicating any number of data blocks) arrive at chunker 606 in serial order. Chunker 606 creates chunks 608 from data blocks 604 and stores them in buffer 610. Chunks 608 are fixed size chunks of portions of the data from the interaction between an endpoint 102 and a GenAI model 110. In some embodiments, data blocks 604 are the size of chunks 608. In some embodiments, when data blocks 604 arrive that are smaller than the chunk size of chunks 608, the remainder of the chunk is padded with null data. In some embodiments, when data blocks 604 arrive that are larger than the chunk size of chunks 608, the data block 604 is divided into two or more chunks 608. As depicted in FIG. 6, chunker 606 generates chunks 608*a* and 608*b* through 608*n* (indicating any number of chunks) in serial order from data blocks 604 and stores them in buffer 610.

Analyzer 614 includes input generator 615. Analyzer 614 obtains chunks 608 in serial order for analysis, and input generator 615 generates inputs for language processing model 616. To help provide context awareness, input generator 615 creates inputs using the target chunk and the detection result from at least the preceding target chunk analysis. The input generated by input generator 615 includes a request to analyze the target chunk, the target chunk (i.e., the text of target chunk), and the detection result from preceding target chunk. The input is submitted to language processing model 616. In some embodiments, the input includes a format for response. For example, the input can request the response (i.e., the detection result) in the form of a risk score, in a structured format (e.g., JSON format), or the like. As one example of generating the input, analyzer 614 obtains chunk C1 608*a* from buffer 610. Input generator 615 creates an input for language processing model 616 including the target chunk, which is chunk C1 608*a* for this example. Language processing model 616 returns the target chunk detection result for chunk C1 608*a*. Analyzer 614 obtains the next target chunk C2 608*b*. Input generator 615 generates an input including target chunk C2 608*b* and the detection result from chunk C1 608*a*. Language processing model 616 processes this input and returns a detection result for chunk C2 608*b*. Analyzer 614 continues this process until it reaches target chunk CN 608*n* (i.e., the last chunk). Input generator 615 generates the input including the target chunk CN 608*n* and the detection result for the preceding chunk CN-1. In some embodiments, the detection results for more than one preceding chunk are included for context awareness. Further, as language processing model 616 returns the detection results for each target chunk, analyzer 614 provides the detection results to security policy enforcement 618 and, in some embodiments, scoring engine 620.

As such, the detection results from one or more immediately preceding chunks are used to provide context awareness for language processing model 616 to analyze a target chunk. The number of preceding chunk detection results can be set for all endpoint 102 and GenAI model 110 combinations or may be dynamically adjusted based on the user risk score or the application risk score associated with the endpoint 102 and/or GenAI model 110 associated with the interaction. Other adjustable parameters such as chunk size may also be set based on the user risk score and/or application risk score, in some embodiments.

Figure 7:
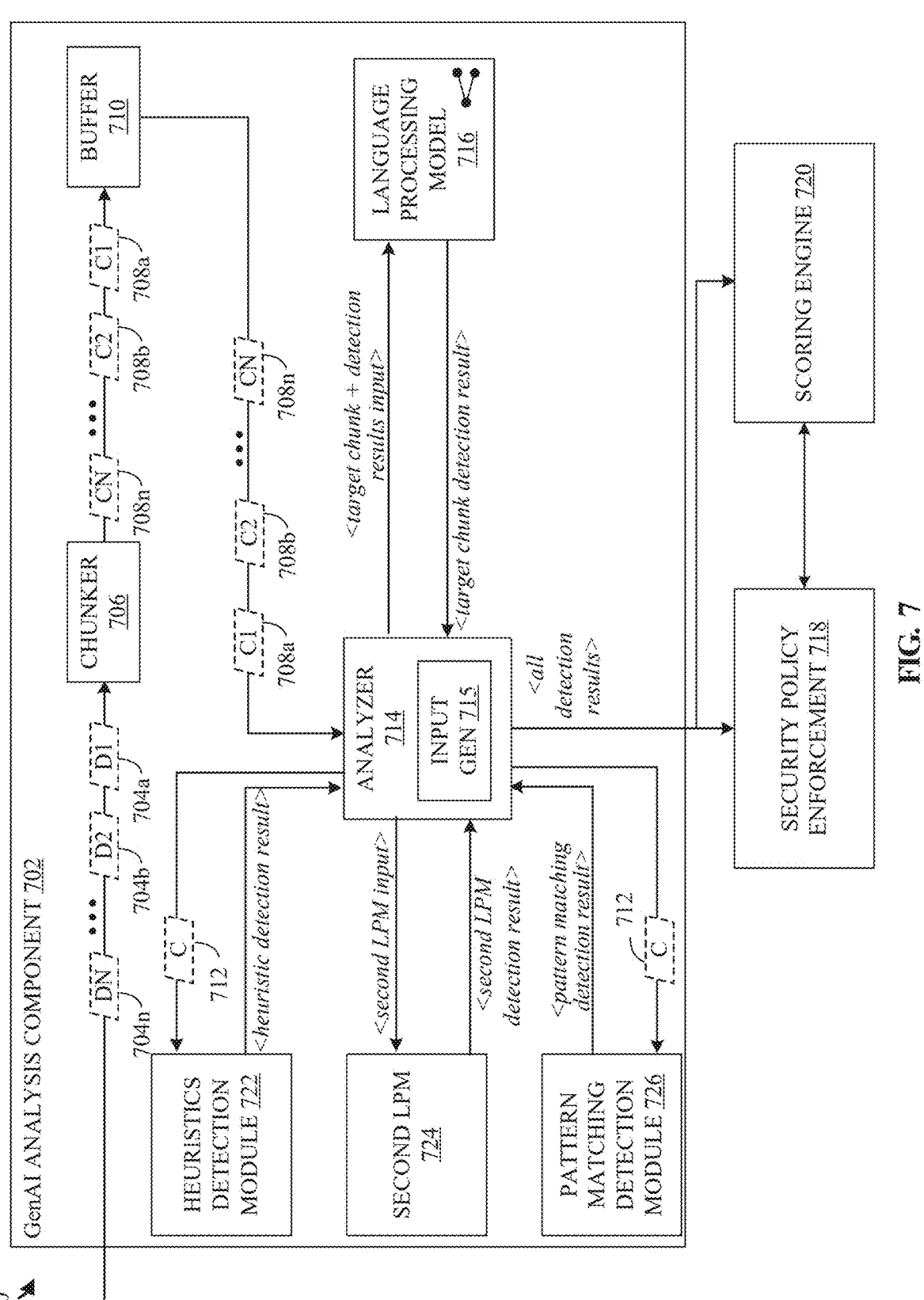
FIG. 7 illustrates an example portion of the network security system of FIG. 1 for performing context aware GenAI traffic inspection using target chunk detection results from various detection modules, according to some embodiments.

FIG. 7 illustrates security system 700, which is generally representative of a portion of network security system 112 in some embodiments. Security system 700 includes GenAI analysis component 702, scoring engine 720, and security policy enforcement 718. Security system 700 includes other components, such as an interception component such as GenAI traffic intercept 114 described in FIG. 1, which are not depicted or described here for brevity. Security policy enforcement 718 is generally representative of security policy enforcement 118, 218, 318, and 618 and scoring engine 720 is generally representative of scoring engine 220, 320, and 620.

GenAI analysis component 702 is generally representative of at least a portion of GenAI traffic inspection 114 of FIG. 1. GenAI analysis component 702 uses the other chunk detection results approach to provide context awareness for language processing model 716. GenAI analysis component 702 includes chunker 706, buffer 710, analyzer 714, language processing model 716, heuristics detection module 722, second language processing model 724, and pattern matching detection module 726.

Chunker 706 is generally representative of chunker 206, 306, and 606, buffer 710 is generally representative of buffer 210, 310, 410, and 610, language processing model 716 is generally representative of language processing model 216, 316, and 616, heuristics detection module 722 is generally representative of heuristics detection module 322, second language processing model 724 is generally representative of second language processing model 324, and pattern matching detection module 726 is generally representative of pattern matching detection module 326. As such, example data blocks 704a and 704b through 704n (indicating any number of data blocks) arrive at chunker 706 in serial order. Chunker 706 creates chunks 708 from data blocks 704 and stores them in buffer 710. Chunks 708 are fixed size chunks of portions of the data from the interaction between an endpoint 102 and a GenAI model 110. In some embodiments, data blocks 704 are the size of chunks 708. In some embodiments, when data blocks 704 arrive that are smaller than the chunk size of chunks 708, the remainder of the chunk is padded with null data. In some embodiments, when data blocks 704 arrive that are larger than the chunk size of chunks 708, the data block 704 is divided into two or more chunks 708. As depicted in FIG. 7, chunker 706 generates chunks 708a and 708b through 708n (indicating any number of chunks) in serial order from data blocks 704 and stores them in buffer 710.

Analyzer 714 includes input generator 715. Analyzer 714 obtains chunks 708 in serial order for analysis, and input generator 715 generates inputs for heuristic detection module 722, second language processing model 724, pattern matching detection module 726, and language processing model 716. First, input generator generates inputs for heuristics detection module 722 and pattern matching detection module 726 for a target chunk 712. Analyzer 714 submits the inputs to heuristics detection module 722 and pattern matching detection module 726 and gets a heuristic detection result and a pattern matching detection result for target chunk 712.

To help provide context awareness, input generator 715 creates inputs for second language processing model 724 and language processing model 716 for target chunk 712 using the heuristic detection result and pattern matching detection result for target chunk 712. For example, analyzer 714 obtains the heuristic detection result and the pattern matching detection result for target chunk 712, and input generator 715 generates the input for language processing model 716 and second language processing model 724 which includes a request to analyze the target chunk 712, the target chunk 712 (i.e., the text of target chunk 712), the heuristic detection result for target chunk 712, and the pattern matching detection result for target chunk 712. In some embodiments, the input includes a format for response. For example, the input can request the response (i.e., the detection result) in the form of a risk score, in a structured format (e.g., JSON format), or the like. Once detection results for target chunk 712 are returned from each of the detection modules (i.e., heuristics detection module 722, pattern matching detection module 726, language processing model 716, and second language processing model 724, analyzer 714 provides the detection results to security policy enforcement 718 and, in some embodiments, scoring engine 720.

As such, the detection results from other analysis of target chunk 712 are used to provide context awareness for language processing model 716 to analyze target chunk 712. This works in part because heuristics detection module 722 and pattern matching detection module 726 maintain context for their own analysis across chunks.

Figure 8:
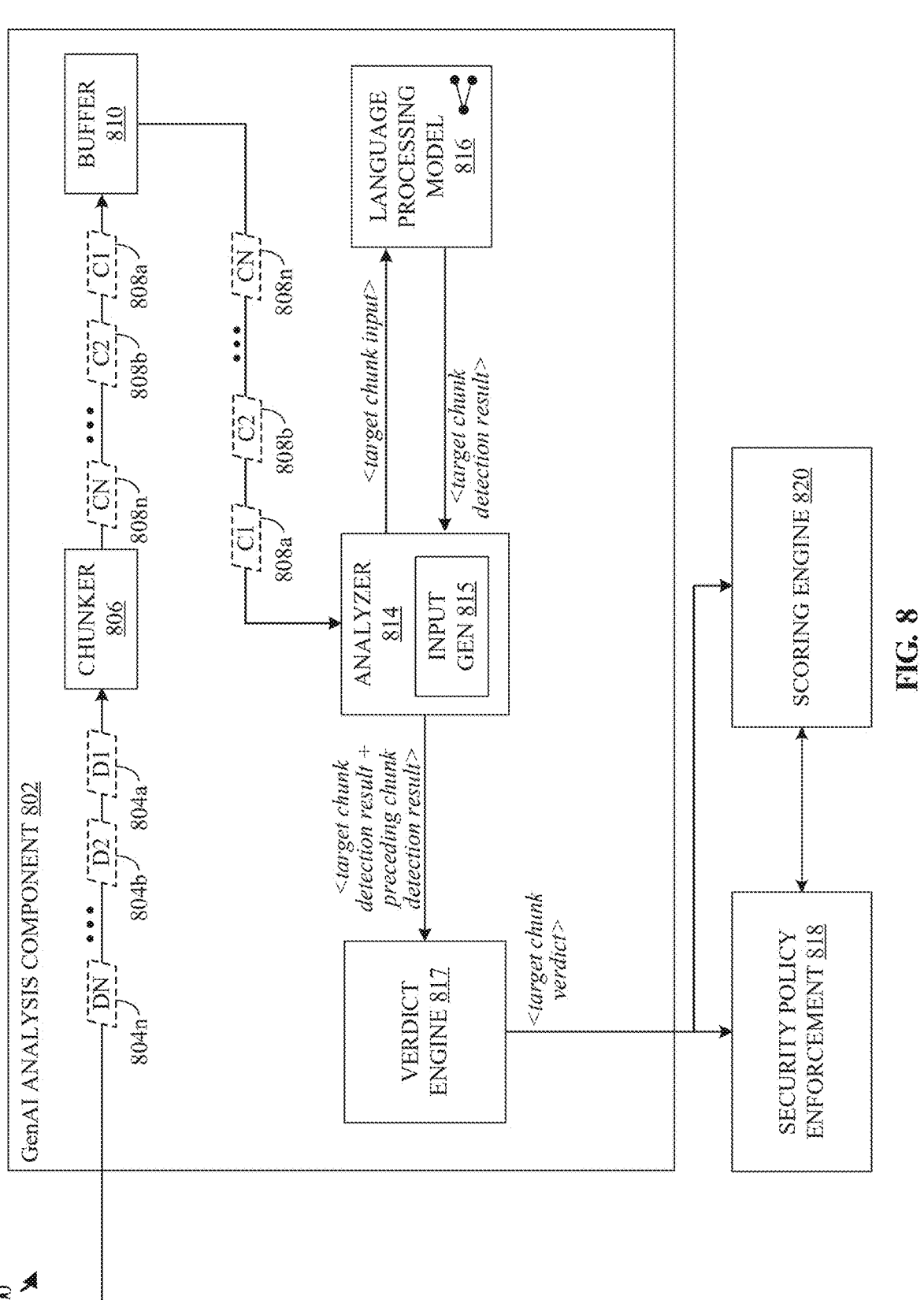
FIG. 8 illustrates an example portion of the network security system of FIG. 1 for performing context aware GenAI traffic inspection using preceding chunk detection results and a verdict engine, according to some embodiments.

FIG. 8 illustrates security system 800, which is generally representative of a portion of network security system 112 in some embodiments. Security system 800 includes GenAI analysis component 802, scoring engine 820, and security policy enforcement 818. Security system 800 includes other components, such as an interception component such as GenAI traffic intercept 114 described in FIG. 1, which are not depicted or described here for brevity. Security policy enforcement 818 is generally representative of security policy enforcement 118, 218, 318, 618, and 718 and scoring engine 820 is generally representative of scoring engine 220, 320, 620, and 720.

GenAI analysis component 802 is generally representative of at least a portion of GenAI traffic inspection 114 of FIG. 1. GenAI analysis component 802 uses the other chunk detection results approach to provide context awareness for results from language processing model 816. GenAI analysis component 802 includes chunker 806, buffer 810, analyzer 814, language processing model 816, and verdict engine 817.

Chunker 806 is generally representative of chunker 206, 306, 606, and 706, buffer 810 is generally representative of buffer 210, 310, 410, 610, and 710, and language processing model 816 is generally representative of language processing model 216, 316, 616, and 716. As such, example data blocks 804a and 804b through 804n (indicating any number of data blocks) arrive at chunker 806 in serial order. Chunker 806 creates chunks 808 from data blocks 804 and stores them in buffer 810. Chunks 808 are fixed size chunks of portions of the data from the interaction between an endpoint 102 and a GenAI model 110. In some embodiments, data blocks 804 are the size of chunks 808. In some embodiments, when data blocks 804 arrive that are smaller than the chunk size of chunks 808, the remainder of the chunk is padded with null data. In some embodiments, when data blocks 804 arrive that are larger than the chunk size of chunks 808, the data block 804 is divided into two or more chunks 808. As depicted in FIG. 8, chunker 806 generates chunks 808a and 808b through 808n (indicating any number of chunks) in serial order from data blocks 804 and stores them in buffer 810.

Analyzer 814 includes input generator 815. Analyzer 814 obtains chunks 808 in serial order for analysis, and input generator 815 generates inputs for language processing model 716. The input includes the target chunk to be analyzed (i.e., the text of the target chunk) and a request to analyze the target chunk. In some embodiments, the input includes a format for response. For example, the input can request the response (i.e., the detection result) in the form of a risk score, in a structured format (e.g., JSON format), or the like. In return, language processing model 816 provides target chunk detection results to analyzer 814.

To help provide context awareness, analyzer 814 creates inputs for verdict engine 817 to generate a verdict for the target chunk. The input includes the target chunk detection result and the detection result from one or more of the immediately preceding chunks. For example, only one preceding chunk detection result may be included in some embodiments. In other embodiments, more than just the first immediately preceding chunk detection results are included. Using two preceding detection results as an example, when chunk C3 (not shown) is analyzed, the detection results for chunks C2 808b and C1 808a are included with the detection result for chunk C3 as an input to verdict engine 817. Verdict engine 817 uses the detection results to make a verdict on the target chunk. For example, verdict engine 817 may use rules, an algorithm, a model, or any other technique to analyze the detection results and create a target chunk verdict. The verdict may be a score which indicates a risk of the target chunk including data that may represent a security concern (e.g., ethical violation, security violation, and/or privacy violation). Verdict engine 817 provides the target chunk verdict to security policy enforcement 818 and, in some embodiments, scoring engine 820.

As such, the detection results from the analysis of chunks preceding the target chunk are used to provide context awareness for analysis by language processing model 816.

Scoring engine 820 may adjust the user risk score and/or the application risk score associated with the endpoint 102 and/or GenAI model 110 associated with the interaction based on the target chunk verdicts or based on information from security policy enforcement 818 after it analyzes the target chunk verdicts. In some embodiments, the user risk score and/or the application risk score are used to determine adjustable parameters of GenAI analysis component 802. For example, the size of the chunks, the number of preceding chunk detection results to use with each target chunk detection result for input to verdict engine 817, and the like may be adjusted. Further, security policy enforcement 818 enforces security policies on the interaction based at least in part on the target chunk verdicts received for the interaction as the interaction unfolds.

Figure 9:
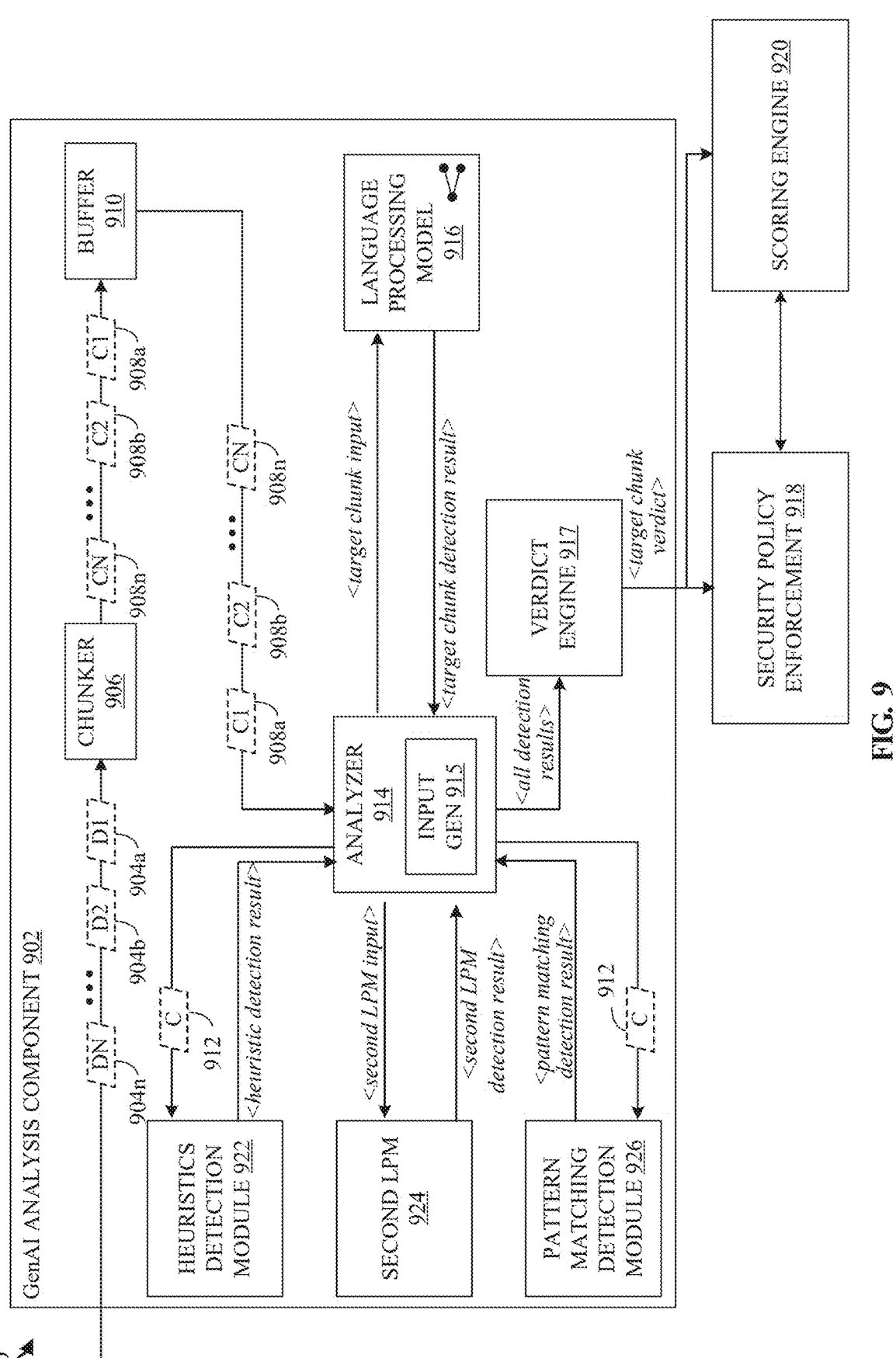
FIG. 9 illustrates an example portion of the network security system of FIG. 1 for performing context aware GenAI traffic inspection using target chunk detection results from multiple detection modules and a verdict engine, according to some embodiments.

FIG. 9 illustrates security system 900, which is generally representative of a portion of network security system 112 in some embodiments. Security system 900 includes GenAI analysis component 902, scoring engine 920, and security policy enforcement 918. Security system 900 includes other components, such as an interception component such as GenAI traffic intercept 114 described in FIG. 1, which are not depicted or described here for brevity. Security policy enforcement 918 is generally representative of security policy enforcement 118, 218, 318, 618, 718, and 818 and scoring engine 920 is generally representative of scoring engine 220, 320, 620, 720, and 820.

GenAI analysis component 902 is generally representative of at least a portion of GenAI traffic inspection 114 of FIG. 1. GenAI analysis component 902 uses the other chunk detection results approach to provide context awareness for language processing model 916. GenAI analysis component 902 includes chunker 906, buffer 910, analyzer 914, language processing model 916, heuristics detection module 922, second language processing model 924, and pattern matching detection module 926.

Chunker 906 is generally representative of chunker 206, 306, 606, 706, and 806, buffer 910 is generally representative of buffer 210, 310, 410, 610, 710, and 810, language processing model 916 is generally representative of language processing model 216, 316, 616, 716, and 816, heuristics detection module 922 is generally representative of heuristics detection module 322 and 722, second language processing model 924 is generally representative of second language processing model 324 and 724, and pattern matching detection module 926 is generally representative of pattern matching detection module 326 and 726. As such, example data blocks 904a and 904b through 904n (indicating any number of data blocks) arrive at chunker 906 in serial order. Chunker 906 creates chunks 908 from data blocks 904 and stores them in buffer 910. Chunks 908 are fixed size chunks of portions of the data from the interaction between an endpoint 102 and a GenAI model 110. In some embodiments, data blocks 904 are the size of chunks 908. In some embodiments, when data blocks 904 arrive that are smaller than the chunk size of chunks 908, the remainder of the chunk is padded with null data. In some embodiments, when data blocks 904 arrive that are larger than the chunk size of chunks 908, the data block 904 is divided into two or more chunks 908. As depicted in FIG. 9, chunker 906 generates chunks 908a and 908b through 908n (indicating any number of chunks) in serial order from data blocks 904 and stores them in buffer 910.

Analyzer 914 includes input generator 915. Analyzer 914 obtains chunks 908 in serial order for analysis, and input generator 915 generates inputs for heuristic detection module 922, second language processing model 924, pattern matching detection module 926, and language processing model 916. Input generator 915 generates inputs for each detection module (e.g., heuristics detection module 922, pattern matching detection module 926, language processing model 916, and second language processing model 924) for a target chunk 912. For language processing model 916, input generator 915 may include a request to analyze target chunk 912 and the target chunk 912 (i.e., the text of target chunk 912) in the input. In some embodiments, the input includes a format for response. For example, the input can request the response (i.e., the detection result) in the form of a risk score, in a structured format (e.g., JSON format), or the like. Analyzer 914 submits the respective input to each detection module and gets a response with a detection result from each. Heuristics detection module 922 returns a heuristic detection result, second language processing model 924 returns a second LPM detection result, pattern matching detection module 926 returns a pattern matching detection result, and language processing model 916 returns a target chunk detection result for target chunk 912.

Once detection results for target chunk 712 are returned from each of the detection modules (i.e., heuristics detection module 922, pattern matching detection module 926, language processing model 916, and second language processing model 924), analyzer 914 provides the detection results to verdict engine 917. Verdict engine 917 is generally representative of verdict engine 717 depicted and described with respect to FIG. 7. Verdict engine 917 receives the detection results from each detection module and provides a verdict for target chunk 912. For example, verdict engine 917 may use rules, algorithms, models, or the like to analyze the detection results for target chunk 912 from each of the detection modules to score target chunk 912 with a score that indicates a level of risk for target chunk 912 containing security concerns (e.g., security violation, privacy violation, ethical violation). Verdict engine 917 provides the target chunk verdict to security policy enforcement 918 and, in some embodiments, scoring engine 920. Security policy enforcement 918 enforces security policies on the interaction based at least in part on the target chunk verdicts as they are generated and provided. Scoring engine 920 uses the target chunk verdicts and/or information from security policy enforcement 918 to adjust the user risk scores and application risk scores for the endpoint 102 and GenAI model 110 associated with the interaction. The user risk score and/or application risk score can be used to set adjustable parameters of GenAI analysis component 902 for a given interaction. For example, the size of the chunks, whether to use second language processing model 924, and the like can be adjusted to increase detection results at the expense of higher resource usage when the user risk score and/or application risk score indicate the GenAI model 110 and/or the user of endpoint 102 are more risky than average.

As such, the detection results from other analysis of target chunk 912 are used to provide context awareness for the analysis of target chunk 912 from language processing model 916. This works in part because heuristics detection module 922 and pattern matching detection module 926 maintain context for their own analysis across chunks.

FIG. 10 illustrates method 1000, which can be performed by network security system 112 implementing security system portion 600, security system portion 700, security system portion 800, or security system portion 900 for GenAI traffic inspection 116. Method 1000 may include additional steps, or the steps may be performed repeatedly, in any order, or in parallel to process multiple interactions between various endpoints 102 and GenAI models 110. Method 1000 includes step 1002 which is receiving, by a network security system (NSS) interposed on a network between an endpoint and a generative artificial intelligence (GenAI) model, an interaction between the endpoint and the GenAI model, wherein data of the interaction arrives at the NSS in serial order. For example, NSS 112 intercepts communications between endpoint 102 and GenAI model 110. GenAI traffic intercept 114 obtains the communication packets and strips the payloads out to identify the prompts and responses and provides them to GenAI traffic inspection 116. GenAI traffic inspection 116 implementing GenAI analysis component 602, 702, 802, or 902 receives the data of an interaction in serial order.

Method 1000 further includes step 1004 in which the interaction is analyzed. Step 1004 includes substeps 1006-1010. Substep 1006 includes storing the data of the interaction in chunks in serial order as the data arrives. For example, chunker 606, 706, 806, 906 receives data blocks 604, 704, 804, 904 and generates chunks 608, 708, 808, 908 and stores the chunks in buffer 610, 710, 810, 910.

Substep 1008 includes evaluating each chunk in serial order with a detection module of the NSS, wherein the detection module comprises a language processing model. For example, each chunk (e.g., chunks 608, 708, 808, 908) are evaluated by the language processing model (e.g., 616, 716, 816, 916).

Substep 1010 includes using detection results of one or more chunks to provide context awareness for the respective chunk. For example, input generator 615 includes the detection result for the preceding chunk with the target chunk to generate the input for language processing model 616. In this case, the preceding chunk detection result is used for context awareness. In another example, input generator 715 includes the detection results from heuristics detection module 722 and pattern matching detection module 726 for the target chunk 712 along with the target chunk 712 for the input to language processing model 716. In this case, the target chunk detection results from the heuristics detection module 722 and pattern matching detection module 726 provide context awareness. In yet another example, analyzer 814 includes the detection result from the target chunk and the detection result from the preceding chunk as input to the verdict engine 817 to provide the context awareness for the target chunk verdict. In yet another example, analyzer 914 includes the detection result from all of the detection modules (e.g., heuristics detection module 922, second language processing model 924, pattern matching detection module 926, and language processing model 916) for a target chunk as the input to verdict engine 917 to provide the context awareness for the target chunk verdict.

Method 1000 further includes step 1012, which includes applying, by the NSS, a security policy to the interaction based at least in part on results of the analyzing the interaction including the detection results of the chunks. For example, security policy enforcement 118, 618, 718, 818, 918 applies security policies to the interactions based on the detection results from GenAI analysis component 602, 702, 802, 902, or GenAI traffic inspection 116.

Figure 11:
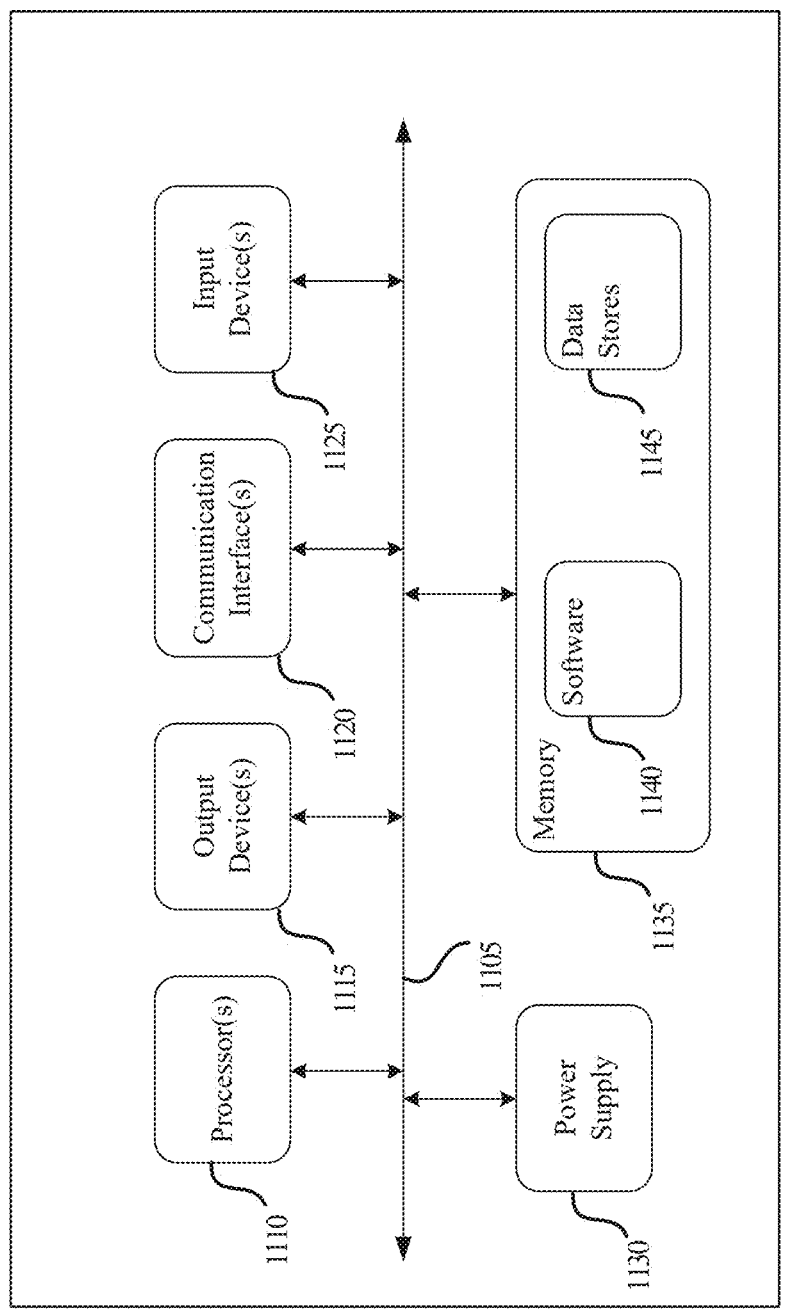
FIG. 11 illustrates an exemplary computing system, according to some embodiments.

FIG. 11 illustrates a computing device 1100. The computing device 1100 includes various components not included for ease of description in other computing devices discussed herein including, for example, endpoints 102, network security system 112, and GenAI model 110. Accordingly, computing device 1100 may be endpoints 102, network security system 112, or GenAI model 110 by incorporating the functionality described in each.

Computing device 1100 is suitable for implementing processing operations described herein related to security enforcement and context aware GenAI traffic inspection, with which aspects of the present disclosure may be practiced. Computing device 1100 may be configured to implement processing operations of any component described herein including the user system components (e.g., endpoints 102 of FIG. 1). As such, computing device 1100 may be configured as a specific purpose computing device that executes specific processing operations to solve the technical problems described herein including those pertaining to security enforcement and context aware GenAI traffic inspection. Computing device 1100 may be implemented as a single apparatus, system, or device or may be implemented in a distributed manner as multiple apparatuses, systems, or devices. For example, computing device 1100 may comprise one or more computing devices that execute processing for applications and/or services over a distributed network to enable execution of processing operations described herein over one or more applications or services. Computing device 1100 may comprise a collection of devices executing processing for front-end applications/services, back-end applications/services, or a combination thereof. Computing device 1100 includes, but is not limited to, a bus 1105 communicably coupling processors 1110, output devices 1115, communication interfaces 1120, input devices 1125, power supply 1130, and memory 1135.

Non-limiting examples of computing device 1100 include smart phones, laptops, tablets, PDAs, desktop computers, servers, blade servers, cloud servers, smart computing devices including television devices and wearable computing devices including VR devices and AR devices, e-reader devices, gaming consoles and conferencing systems, among other non-limiting examples.

Processors 1110 may include general processors, specialized processors such as graphical processing units (GPUs) and digital signal processors (DSPs), or a combination. Processors 1110 may load and execute software 1140 from memory 1135. Software 1140 may include one or more software components such as GenAI traffic intercept 114, GenAI traffic inspection 116, security policy enforcement 118, endpoint routing client 104, or any combination including other software components. In some examples, computing device 1100 may be connected to other computing devices (e.g., display device, audio devices, servers, mobile devices, remote devices, VR devices, AR devices, or the like) to further enable processing operations to be executed. When executed by processors 1110, software 1140 directs processors 1110 to operate as described herein for at least the various processes, operational scenarios, and sequences discussed in the foregoing implementations. Computing device 1100 may optionally include additional devices, features, or functionality not discussed for purposes of brevity. For example, software 1140 may include an operating system that is executed on computing device 1100. Computing device 1100 may further be utilized as endpoints 102 or any of the cloud computing systems in security environment 100

(FIG. 1) including network security system 112 or may execute the method 500 of FIG. 5 or method 1000 of FIG. 10.

Referring still to FIG. 11, processors 1110 may include a processor or microprocessor and other circuitry that retrieves and executes software 1140 from memory 1135. Processors 1110 may be implemented within a single processing device but may also be distributed across multiple processing devices or sub-systems that cooperate in executing program instructions. Examples of processors 1110 include general purpose central processing units, microprocessors, graphical processing units, application specific processors, sound cards, speakers and logic devices, gaming devices, VR devices, AR devices as well as any other type of processing devices, combinations, or variations thereof.

Memory 1135 may include any computer-readable storage device readable by processors 1110 and capable of storing software 1140 and data stores 1145. Data stores 1145 may include data stores that maintain security policies used by security policy enforcer 140, for example. Memory 1135 may include volatile and nonvolatile, removable and non-removable media implemented in any method or technology for storage of information, such as computer readable instructions, data structures, program modules, cache memory, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or other suitable storage media, except for propagated signals. In no case is the computer-readable storage device a propagated signal.

In addition to computer-readable storage devices, in some implementations, memory 1135 may also include computer-readable communication media over which at least some of software 1140 may be communicated internally or externally. Memory 1135 may be implemented as a single storage device but may also be implemented across multiple storage devices or sub-systems co-located or distributed relative to each other. Memory 1135 may include additional elements, such as a controller, capable of communicating with processors 1110 or possibly other systems.

Software 1140 may be implemented in program instructions and among other functions may, when executed by processors 1110, direct processors 1110 to operate as described with respect to the various operational scenarios, sequences, and processes illustrated herein. For example, software 1140 may include program instructions for executing context aware GenAI traffic inspection (e.g., GenAI traffic intercept 114, GenAI traffic inspection 116, GenAI analysis component 202, GenAI analysis component 302, GenAI analysis component 602, GenAI analysis component 702, GenAI analysis component 802, GenAI analysis component 902, scoring engine 220, scoring engine 320, scoring engine 620, scoring engine 720, scoring engine 820, scoring engine 920) or security policy enforcement (e.g., security policy enforcement 118, security policy enforcement 218, security policy enforcement 618, security policy enforcement 718, security policy enforcement 818, security policy enforcement 918) as described herein.

In particular, the program instructions may include various components or modules that cooperate or otherwise interact to conduct the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 1140 may include additional processes, programs, or components, such as operating system software, virtual machine software, or other application software. Software 1140 may also include firmware or some other form of machine-readable processing instructions executable by processors 1110.

In general, software 1140 may, when loaded into processors 1110 and executed, transform a suitable apparatus, system, or device (of which computing device 1100 is representative) overall from a general-purpose computing system into a special-purpose computing system customized to execute specific processing components described herein as well as process data and respond to queries. Indeed, encoding software 1140 on memory 1135 may transform the physical structure of memory 1135. The specific transformation of the physical structure may depend on various factors in different implementations of this description. Examples of such factors may include, but are not limited to, the technology used to implement the storage media of memory 1135 and whether the computer-storage media are characterized as primary or secondary storage, as well as other factors.

For example, if the computer readable storage device is implemented as semiconductor-based memory, software 1140 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interfaces 1120 may include communication connections and devices that allow for communication with other computing systems (not shown) over communication networks (not shown). Communication interfaces 1120 may also be utilized to cover interfacing between processing components described herein. Examples of connections and devices that together allow for inter-system communication may include network interface cards or devices, antennas, satellites, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication interfaces 1120 may also include associated user interface software executable by processors 1110 in support of the various user input and output devices discussed below. Separately or in conjunction with each other and other hardware and software elements, the user interface software and user interface devices may support a graphical user interface, a natural user interface, or any other type of user interface, for example, which enables front-end processing and including rendering of user interfaces, such as a user interface that is used by a user on endpoint 102. Exemplary applications and services may further be configured to interface with processing components of computing device 1100 that enable output of other types of signals (e.g., audio output, handwritten input) in conjunction with operation of exemplary applications or services (e.g., a collaborative communication application or service, electronic meeting application or service, or the like) described herein.

Input devices 1125 may include a keyboard, a mouse, a voice input device, a touch input device for receiving a touch gesture from a user, a motion input device for detecting non-touch gestures and other motions by a user, gaming accessories (e.g., controllers and/or headsets) and other comparable input devices and associated processing elements capable of receiving user input from a user. Output devices 1115 may include a display, speakers, haptic devices, and the like. In some cases, the input and output devices may be combined in a single device, such as a display capable of displaying images and receiving touch gestures. The aforementioned user input and output devices are well known in the art and need not be discussed at length here.

Communication between computing device 1100 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPV6, etc.), the transfer control protocol (TCP), and the user datagram protocol (UDP), as well as any other suitable communication protocol, variation, or combination thereof.

The computing device 1100 has a power supply 1130, which may be implemented as one or more batteries. The power supply 1130 may further include an external power source, such as an AC adapter or a powered docking cradle that supplements or recharges the batteries. In some embodiments, the power supply 1130 may not include batteries and the power source may be an external power source such as an AC adapter.

EXAMPLES

The following illustrative examples are mentioned not to limit or define the scope of this disclosure, but rather to provide examples to aid understanding thereof. Illustrative examples are discussed above in the Detailed Description, which provides further description.

Advantages offered by various examples may be further understood by examining this Specification. As used below, any reference to a series of examples is to be understood as a reference to each of those examples disjunctively (e.g., "Examples 1-4" is to be understood as "Examples 1, 2, 3, or 4").

Example 1 is a computer-implemented method, comprising: receiving, by a network security system (NSS) interposed on a network between an endpoint and a generative artificial intelligence (GenAI) model, an interaction between the endpoint and the GenAI model, wherein data of the interaction arrives at the NSS in serial order; analyzing, by the NSS, the interaction, wherein the analyzing comprises: storing the data of the interaction in chunks in serial order as the data arrives, selecting a batch of the chunks, including a target chunk, that fall within a sliding window based on applying the sliding window to the target chunk such that a number of chunks preceding the target chunk in serial order fall within the sliding window, evaluating the batch of the chunks with a detection module of the NSS, wherein: the detection module comprises a language processing model; and the chunks preceding the target chunk provide context awareness to the language processing model for the target chunk, and repeatedly advancing the sliding window from the target chunk to the next chunk in serial order to select the next batch of the chunks to evaluate with the detection module; and applying, by the NSS, a security policy to the interaction based at least in part on results of analyzing the interaction.

Example 2 is the computer-implemented method of any previous or subsequent example, further comprising: dynamically selecting at least one parameter of adjustable parameters used in the analyzing, wherein the adjustable parameters comprise the number of chunks that fall within the sliding window and a size of the chunks.

Example 3 is the computer-implemented method of any previous or subsequent example, wherein the dynamically selecting is based at least in part on a risk score of a user account associated with the interaction.

Example 4 is the computer-implemented method of any previous or subsequent example, wherein the dynamically selecting is based at least in part on a risk score of the GenAI model.

Example 5 is the computer-implemented method of any previous or subsequent example, further comprising: adjusting a user risk score of a user account associated with the interaction based at least in part on the results of the analyzing the interaction; and adjusting an application risk score of the GenAI model based at least in part on the results of the analyzing the interaction.

Example 6 is the computer-implemented method of any previous or subsequent example, wherein the language processing model is one of a large language model and a small language model.

Example 7 is the computer-implemented method of any previous or subsequent example, wherein: the language processing model is a small language model; the detection module is a first detection module; and the analyzing further comprises: evaluating the batch of the chunks with a second detection module of the NSS, wherein the second detection module comprises a large language model.

Example 8 is the computer-implemented method of any previous or subsequent example, wherein the analyzing further comprises: evaluating the target chunk with a heuristics detection module; and evaluating the target chunk with a pattern matching detection module.

Example 9 is the computer-implemented method of any previous or subsequent example, wherein the applying the security policy comprises: in response to identifying no security violation, transmitting the target chunk to an intended destination; and in response to identifying a security violation, performing a security action, wherein the security action comprises at least one of: terminating the interaction; and transmitting a notification of the security violation.

Example 10 is the computer-implemented method of any previous or subsequent example, wherein the interaction comprises one or more prompts submitted from the endpoint to the GenAI model, a response from the GenAI model to at least one of the one or more prompts, or a combination thereof.

Example 11 is the computer-implemented method of any previous or subsequent example, wherein: the interaction comprises at least one streamed response from the GenAI model.

Example 12 is a network security system (NSS), comprising: a generative artificial intelligence (GenAI) analysis component, comprising: a detection module comprising a language processing model, wherein the GenAI analysis component is configured to: receive an interaction between an endpoint and a GenAI model, wherein data of the interaction arrives at the NSS in serial order; analyze the interaction, wherein to analyze the interaction, the GenAI analysis component is configured to: store the data of the interaction in chunks in the serial order as the data arrives, select a batch of the chunks, including a target chunk, that fall within a sliding window based on applying the sliding window to the target chunk such that a number of chunks preceding the target chunk in serial order fall within the sliding window, evaluate the batch of the chunks with the detection module, wherein the chunks preceding the target chunk provide context awareness to the language processing model for the target chunk, and repeatedly advance the sliding window from the target chunk to the next chunk in serial order to select the next batch of the chunks to evaluate with the detection module; and a security policy enforcement component configured to: apply a security policy to the interaction based at least in part on results from the GenAI analysis component analyzing the interaction.

Example 13 is the NSS of any previous or subsequent example, wherein the GenAI analysis component is further configured to: dynamically select at least one parameter of adjustable parameters used to analyze the interaction, wherein the adjustable parameters comprise the number of chunks that fall within the sliding window and a size of the chunks.

Example 14 is the NSS of any previous or subsequent example, further comprising:

a scoring component configured to: adjust a user risk score associated with a user account associated with the interaction based at least in part on the results from the GenAI analysis component; and adjust an application risk score associated with the GenAI model based at least in part on the results from the GenAI analysis component; and wherein the GenAI analysis component is further configured to dynamically select the at least one parameter based at least in part on the user risk score, the application risk score, or a combination thereof.

Example 15 is the NSS of any previous or subsequent example, wherein the language processing model is one of a large language model and a small language model.

Example 16 is the NSS of any previous or subsequent example, wherein: the language processing model is a small language model; the detection module is a first detection module of the GenAI analysis component; and the GenAI analysis component further comprises: a second detection module comprising a large language model, wherein the GenAI analysis component is further configured to evaluate the batch of the chunks with the second detection module and the chunks preceding the target chunk provide context awareness to the large language model for the target chunk.

Example 17 is the NSS of any previous or subsequent example, wherein the GenAI analysis component further comprises: a heuristics detection module configured to evaluate the target chunk using heuristics; and a pattern matching detection module configured to evaluate the target chunk using pattern matching.

Example 18 is the NSS of any previous or subsequent example, wherein the security policy enforcement component is further configured to: in response to identifying no security violation, allow transmission of the target chunk to an intended destination; and in response to identifying a security violation, perform a security action, wherein the security action comprises at least one of: terminating the interaction; and transmitting a notification of the security violation.

Example 19 is the NSS of any previous or subsequent example, wherein the interaction comprises at least one of: a prompt submitted from the endpoint to the GenAI model; a response to the prompt from the GenAI model; and a streamed response to the prompt from the GenAI model.

Example 20 is a network security system (NSS) interposed on a network between an endpoint and a generative artificial intelligence (GenAI) model, the NSS comprising: a processing system; and a memory having stored thereon instructions that, upon execution by the processing system, cause the processing system to: receive an interaction between the endpoint and the GenAI model, wherein data of the interaction arrives at the NSS in serial order; analyze the interaction, wherein the instructions to analyze comprise instructions to: store the data of the interaction in chunks in serial order as the data arrives, select a batch of the chunks, including a target chunk, that fall within a sliding window based on applying the sliding window to the target chunk such that a number of chunks preceding the target chunk in serial order fall within the sliding window, evaluate the batch of the chunks with a detection module of the NSS, wherein: the detection module comprises a language processing model; and the chunks preceding the target chunk provide context awareness to the language processing model for the target chunk, and repeatedly advance the sliding window from the target chunk to the next chunk in serial order to select the next batch of the chunks to evaluate with the detection module; and apply a security policy to the interaction based at least in part on results of analyzing the interaction.

Example 21 is a computer-implemented method, comprising: receiving, by a network security system (NSS) interposed on a network between an endpoint and a generative artificial intelligence (GenAI) model, an interaction between the endpoint and the GenAI model, wherein data of the interaction arrives at the NSS in serial order; analyzing, by the NSS, the interaction, wherein the analyzing comprises: storing the data of the interaction in chunks in serial order as the data arrives, evaluating each chunk in serial order with a detection module of the NSS, wherein the detection module comprises a language processing model, and using detection results of one or more chunks to provide context awareness for the respective chunk; and applying, by the NSS, a security policy to the interaction based at least in part on results of the analyzing the interaction including the detection results of the chunks.

Example 22 is the computer-implemented method of any previous or subsequent example, wherein: the using the detection results of one or more chunks to provide context awareness comprises generating an input comprising the respective chunk and the detection result for the preceding chunk; and the evaluating each chunk comprises submitting the input to the language processing model of the detection module to generate the detection result for the respective chunk.

Example 23 is the computer-implemented method of any previous or subsequent example, wherein the using the detection results of one or more chunks to provide context awareness comprises: submitting the detection result for the respective chunk with the detection result for the preceding chunk to a verdict engine to generate a final detection result for the respective chunk.

Example 24 is the computer-implemented method of any previous or subsequent example, further comprising: dynamically selecting at least one parameter of adjustable parameters used in the analyzing, wherein the adjustable parameters comprise a size of the chunks and a number of the one or more chunks used to provide the context awareness for the respective chunk.

Example 25 is the computer-implemented method of any previous or subsequent example, wherein the dynamically selecting is based at least in part on a risk score of a user account associated with the interaction.

Example 26 is the computer-implemented method of any previous or subsequent example, wherein the dynamically selecting is based at least in part on a risk score of the GenAI model.

Example 27 is the computer-implemented method of any previous or subsequent example, further comprising: adjusting a user risk score of a user account associated with the interaction based at least in part on the results of the analyzing the interaction; and adjusting an application risk score of the GenAI model based at least in part on the results of the analyzing the interaction.

Example 28 is the computer-implemented method of any previous or subsequent example, wherein: the language processing model is a small language model; the detection module is a first detection module; and the analyzing further comprises: evaluating each chunk in serial order with a second detection module of the NSS, wherein the second detection module comprises a large language model.

Example 29 is the computer-implemented method of any previous or subsequent example, wherein the language processing model is one of a large language model and a small language model.

Example 30 is the computer-implemented method of any previous or subsequent example, wherein the analyzing further comprises: evaluating each chunk with a heuristics detection module to generate a heuristic detection result for each chunk; and evaluating each chunk with a pattern matching detection module to generate a pattern matching detection result for each chunk.

Example 31 is the computer-implemented method of any previous or subsequent example, wherein: the using the detection results of one or more chunks to provide context awareness comprises generating an input comprising the respective chunk, the heuristic detection result for the respective chunk, and the pattern matching detection result for the respective chunk; and the evaluating each chunk comprises submitting the input to the language processing model of the detection module.

Example 32 is the computer-implemented method of any previous or subsequent example, wherein the using the detection results of one or more chunks to provide context awareness comprises: submitting the detection result for the respective chunk, the heuristic detection result for the respective chunk, and the pattern matching detection result for the respective chunk to a verdict engine to get a final detection result for the respective chunk.

Example 33 is the computer-implemented method of any previous or subsequent example, wherein the applying the security policy comprises: in response to identifying no security violation, transmitting the respective chunk to an intended destination; and in response to identifying a security violation, performing a security action, wherein the security action comprises at least one of: terminating the interaction; and transmitting a notification of the security violation.

Example 34 is the computer-implemented method of any previous or subsequent example, wherein the interaction comprises one or more prompts submitted from the endpoint to the GenAI model, a response from the GenAI model to at least one of the one or more prompts, or a combination thereof.

Example 35 is the computer-implemented method of any previous or subsequent example, wherein: the interaction comprises at least one streamed response from the GenAI model.

Example 36 is a network security system (NSS), comprising: a generative artificial intelligence (GenAI) analysis component, comprising: a detection module comprising a language processing model, wherein the GenAI analysis component is configured to: receive an interaction between an endpoint and a GenAI model, wherein data of the interaction arrives at the NSS in serial order; analyze the interaction, wherein to analyze the interaction, the GenAI analysis component is configured to: store the data of the interaction in chunks in the serial order as the data arrives, evaluate each chunk in serial order with a detection module comprising a language processing model, and use detection results of one or more chunks to provide context awareness for the respective chunk; and a security policy enforcement component configured to: apply a security policy to the interaction based at least in part on results, including the detection results of the chunks, from the GenAI analysis component analyzing the interaction.

Example 37 is the NSS of any previous or subsequent example, wherein: to use the detection results of one or more chunks to provide context awareness, the GenAI analysis component is further configured to generate an input comprising the respective chunk and the detection result for the preceding chunk; and to evaluate each chunk, the GenAI analysis component is further configured to submit the input to the language processing model of the detection module to generate the detection result for the respective chunk.

Example 38 is the NSS of any previous or subsequent example, wherein to use the detection results of one or more chunks to provide the context awareness, the GenAI analysis component is further configured to submit the detection result for the respective chunk with the detection result for the preceding chunk to a verdict engine to generate a final detection result for the respective chunk.

Example 39 is the NSS of any previous or subsequent example, wherein: the language processing model is one of a large language model and a small language model; to analyze the interaction, the GenAI analysis component is further configured to: evaluate each chunk with a heuristics detection module to generate a heuristic detection result for each chunk, and evaluate each chunk with a pattern matching detection module to generate a pattern matching detection result for each chunk; to use the detection results of one or more chunks to provide context awareness, the GenAI analysis component is further configured to generate an input comprising the respective chunk, the heuristic detection result for the respective chunk, and the pattern matching detection result for the respective chunk; and to evaluate each chunk, the GenAI analysis component is further configured to submit the input to the language processing model of the detection module.

Example 40 is a network security system (NSS) interposed on a network between an endpoint and a generative artificial intelligence (GenAI) model, the NSS comprising: a processing system; and a memory having stored thereon instructions that, upon execution by the processing system, cause the processing system to: receive an interaction between the endpoint and the GenAI model, wherein data of the interaction arrives at the NSS in serial order; analyze the interaction, wherein the instructions to analyze comprise instructions to: store the data of the interaction in chunks in serial order as the data arrives, evaluate each chunk in serial order with a detection module of the NSS, wherein the detection module comprises a language processing model, and use detection results of one or more chunks to provide context awareness for the respective chunk; and apply a security policy to the interaction based at least in part on results of the analyzing the interaction.

The aforementioned discussion is presented to enable any person skilled in the art to make and use the technology disclosed and is provided in the context of a particular application and its requirements. Various modifications to the disclosed implementations will be readily apparent to those skilled in the art, and the general principles defined herein may be applied to other implementations and applications without departing from the spirit and scope of the technology disclosed. Thus, the technology disclosed is not intended to be limited to the implementations shown but is to be accorded the widest scope consistent with the principles and features disclosed herein.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list.

The phrases "in some embodiments," "according to some embodiments," "in the embodiments shown," "in other embodiments," and the like generally mean the particular feature, structure, or characteristic following the phrase is included in at least one implementation of the present technology and may be included in more than one implementation. In addition, such phrases do not necessarily refer to the same embodiments or different embodiments.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel or may be performed at different times. Further any specific numbers noted herein are only examples: alternative implementations may employ differing values or ranges.

What is claimed is:

1. A computer-implemented method, comprising:
receiving, by a network security system (NSS) interposed on a network between an endpoint and a generative artificial intelligence (GenAI) model, an interaction between the endpoint and the GenAI model, wherein data of the interaction arrives at the NSS in serial order;
analyzing, by the NSS, the interaction, wherein the analyzing comprises:
storing the data of the interaction in chunks in serial order as the data arrives,
selecting a batch of the chunks, including a target chunk, that fall within a sliding window based on applying the sliding window to the target chunk such that a number of chunks preceding the target chunk in serial order fall within the sliding window,
evaluating the batch of the chunks with a detection module of the NSS, wherein:
the detection module comprises a language processing model; and
the chunks preceding the target chunk provide context awareness to the language processing model for the target chunk, and
repeatedly advancing the sliding window from the target chunk to the next chunk in serial order to select the next batch of the chunks to evaluate with the detection module; and
applying, by the NSS, a security policy to the interaction based at least in part on results of analyzing the interaction.

2. The computer-implemented method of claim 1, further comprising:
dynamically selecting at least one parameter of adjustable parameters used in the analyzing, wherein the adjustable parameters comprise the number of chunks that fall within the sliding window and a size of the chunks.

3. The computer-implemented method of claim 2, wherein the dynamically selecting is based at least in part on a risk score of a user account associated with the interaction.

4. The computer-implemented method of claim 2, wherein the dynamically selecting is based at least in part on a risk score of the GenAI model.

5. The computer-implemented method of claim 1, further comprising:

adjusting a user risk score of a user account associated with the interaction based at least in part on the results of the analyzing the interaction; and adjusting an application risk score of the GenAI model based at least in part on the results of the analyzing the interaction.

6. The computer-implemented method of claim 1, wherein the language processing model is one of a large language model and a small language model.

7. The computer-implemented method of claim 1, wherein:

the language processing model is a small language model;

the detection module is a first detection module; and the analyzing further comprises:

evaluating the batch of the chunks with a second detection module of the NSS, wherein the second detection module comprises a large language model.

8. The computer-implemented method of claim 7, wherein the analyzing further comprises:

evaluating the target chunk with a heuristics detection module; and evaluating the target chunk with a pattern matching detection module.

9. The computer-implemented method of claim 1, wherein the applying the security policy comprises:

in response to identifying no security violation, transmitting the target chunk to an intended destination; and in response to identifying a security violation, performing a security action, wherein the security action comprises at least one of:

terminating the interaction; and transmitting a notification of the security violation.

10. The computer-implemented method of claim 1, wherein the interaction comprises one or more prompts submitted from the endpoint to the GenAI model, a response from the GenAI model to at least one of the one or more prompts, or a combination thereof.

11. The computer-implemented method of claim 1, wherein:

the interaction comprises at least one streamed response from the GenAI model.

12. A network security system (NSS), comprising:

a generative artificial intelligence (GenAI) analysis component, comprising:

a detection module comprising a language processing model, wherein the GenAI analysis component is configured to:

receive an interaction between an endpoint and a GenAI model, wherein data of the interaction arrives at the NSS in serial order;

analyze the interaction, wherein to analyze the interaction, the GenAI analysis component is configured to:

store the data of the interaction in chunks in the serial order as the data arrives, select a batch of the chunks, including a target chunk, that fall within a sliding window based on applying the sliding window to the target chunk such that a number of chunks preceding the target chunk in serial order fall within the sliding window, evaluate the batch of the chunks with the detection module, wherein the chunks preceding the target chunk provide context awareness to the language processing model for the target chunk, and repeatedly advance the sliding window from the target chunk to the next chunk in serial order to select the next batch of the chunks to evaluate with the detection module; and a security policy enforcement component configured to:

apply a security policy to the interaction based at least in part on results from the GenAI analysis component analyzing the interaction.

13. The NSS of claim 12, wherein the GenAI analysis component is further configured to:

dynamically select at least one parameter of adjustable parameters used to analyze the interaction, wherein the adjustable parameters comprise the number of chunks that fall within the sliding window and a size of the chunks.

14. The NSS of claim 13, further comprising:

a scoring component configured to:

adjust a user risk score associated with a user account associated with the interaction based at least in part on the results from the GenAI analysis component; and adjust an application risk score associated with the GenAI model based at least in part on the results from the GenAI analysis component; and wherein the GenAI analysis component is further configured to dynamically select the at least one parameter based at least in part on the user risk score, the application risk score, or a combination thereof.

15. The NSS of claim 12, wherein the language processing model is one of a large language model and a small language model.

16. The NSS of claim 12, wherein:

the language processing model is a small language model;

the detection module is a first detection module of the GenAI analysis component; and the GenAI analysis component further comprises:

a second detection module comprising a large language model, wherein the GenAI analysis component is further configured to evaluate the batch of the chunks with the second detection module and the chunks preceding the target chunk provide context awareness to the large language model for the target chunk.

17. The NSS of claim 16, wherein the GenAI analysis component further comprises:

a heuristics detection module configured to evaluate the target chunk using heuristics; and a pattern matching detection module configured to evaluate the target chunk using pattern matching.

18. The NSS of claim 12, wherein the security policy enforcement component is further configured to:

in response to identifying no security violation, allow transmission of the target chunk to an intended destination; and in response to identifying a security violation, perform a security action, wherein the security action comprises at least one of:

terminating the interaction; and transmitting a notification of the security violation.

19. The NSS of claim 12, wherein the interaction comprises at least one of:

a prompt submitted from the endpoint to the GenAI model;

a response to the prompt from the GenAI model; and a streamed response to the prompt from the GenAI model.

20. A network security system (NSS) interposed on a network between an endpoint and a generative artificial intelligence (GenAI) model, the NSS comprising:

a processing system; and a memory having stored thereon instructions that, upon execution by the processing system, cause the processing system to:

receive an interaction between the endpoint and the GenAI model, wherein data of the interaction arrives at the NSS in serial order;

analyze the interaction, wherein the instructions to analyze comprise instructions to:

store the data of the interaction in chunks in serial order as the data arrives, select a batch of the chunks, including a target chunk, that fall within a sliding window based on applying the sliding window to the target chunk such that a number of chunks preceding the target chunk in serial order fall within the sliding window, evaluate the batch of the chunks with a detection module of the NSS, wherein:

the detection module comprises a language processing model; and the chunks preceding the target chunk provide context awareness to the language processing model for the target chunk, and repeatedly advance the sliding window from the target chunk to the next chunk in serial order to select the next batch of the chunks to evaluate with the detection module; and apply a security policy to the interaction based at least in part on results of analyzing the interaction.

\* \* \* \* \*